United States Patent
Yoon et al.

(10) Patent No.: US 11,064,570 B2
(45) Date of Patent: Jul. 13, 2021

(54) COOKING APPLIANCE AND METHOD FOR CONTROLLING THE SAME

(71) Applicant: SAMSUNG ELECTRONICS CO., LTD., Suwon-si (KR)

(72) Inventors: Boo-Keun Yoon, Yongin-si (KR); Jong Hee Han, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 85 days.

(21) Appl. No.: 14/972,528

(22) Filed: Dec. 17, 2015

(65) Prior Publication Data

US 2016/0213189 A1  Jul. 28, 2016

(30) Foreign Application Priority Data

Jan. 28, 2015 (KR) .................. 10-2015-0013893
Feb. 27, 2015 (KR) .................. 10-2015-0028347

(51) Int. Cl.
*A47J 27/00* (2006.01)
*A47J 27/04* (2006.01)
(Continued)

(52) U.S. Cl.
CPC .......... *H05B 1/0261* (2013.01); *A47J 36/321* (2018.08)

(58) Field of Classification Search
CPC ....... H05B 1/0261; A47J 36/32; A47J 36/321; A47J 43/281; A47J 45/068; G01D 7/12; G01D 7/00; G01K 1/024; G01K 2215/00; G01K 2207/06; G01N 33/02; G01N 27/06; Y10T 137/1963
(Continued)

(56) References Cited

U.S. PATENT DOCUMENTS 2,872,353 A * 2/1959 Metheny ................. C23C 18/36
                                                          427/8
3,479,580 A * 11/1969 Hottel, Jr. .............. G01N 27/06
                                                          324/323
(Continued)

FOREIGN PATENT DOCUMENTS

CN        2551992 Y    5/2003
CN      101135640 A    3/2008
(Continued)

OTHER PUBLICATIONS

Search Report dated May 10, 2016, issued by the International Searching Authority in counterpart International Patent Application No. PCT/KR2016/000816 (PCT/ISA/210).
(Continued)

*Primary Examiner* — Eric S Stapleton
(74) *Attorney, Agent, or Firm* — Sughrue Mion, PLLC

(57) ABSTRACT

Provided is a cooking appliance which includes a concentration sensor for detecting a concentration of a reference substance in which proportional amounts of ingredients change in accordance with progress in cooking an object to be heated; a control unit for determining a cooked state of the object to be heated based on the detected concentration of the reference substance; and a communication unit for transmitting, to an external device which is connected to a home network, information which indicates the cooked state of the object to be heated.

21 Claims, 22 Drawing Sheets

(51) Int. Cl.
*H05B 1/02* (2006.01)
*A47J 36/32* (2006.01)

(58) Field of Classification Search
USPC .......................................................... 99/325
See application file for complete search history.

(56) References Cited

U.S. PATENT DOCUMENTS

| | | | | | |
|---|---|---|---|---|---|
| 3,532,519 | A * | 10/1970 | Masahiro | ............ | C23C 18/1617 427/8 |
| 3,748,899 | A * | 7/1973 | Gregg | .................... | G01K 1/022 73/170.34 |
| 3,906,354 | A * | 9/1975 | Murdock | ............... | G01N 27/07 324/448 |
| 4,045,721 | A * | 8/1977 | Swain | .................... | G05D 21/02 320/137 |
| 4,217,189 | A * | 8/1980 | Kerby | ....................... | C25C 7/06 205/337 |
| 4,227,246 | A * | 10/1980 | Vaughan, III | ........... | G01F 15/06 702/22 |
| 4,324,621 | A * | 4/1982 | Kerby | ................ | G01N 27/4161 205/83 |
| 4,383,157 | A * | 5/1983 | Nakata | ................. | H05B 6/6455 219/494 |
| 4,479,852 | A * | 10/1984 | Bindra | ............... | G01N 27/4161 204/434 |
| 4,587,393 | A * | 5/1986 | Ueda | .................... | H05B 6/6411 219/707 |
| 4,658,120 | A * | 4/1987 | Fujikawa | ............. | G01N 27/122 219/505 |
| 4,686,356 | A * | 8/1987 | Ueda | ....................... | H05B 6/745 219/482 |
| 4,699,081 | A * | 10/1987 | Mack | .................. | C23C 18/1617 118/610 |
| 4,823,087 | A * | 4/1989 | Sugimori | ............. | G01N 27/046 324/439 |
| 5,045,658 | A * | 9/1991 | Smith | .................... | G05D 23/24 219/516 |
| 5,622,643 | A * | 4/1997 | Morizot | ............ | H02M 7/53803 219/625 |
| 5,662,025 | A * | 9/1997 | Yoo | ....................... | A47J 27/004 99/332 |
| 5,738,772 | A * | 4/1998 | Bartasis | ............... | A23C 19/082 118/664 |
| 5,744,785 | A * | 4/1998 | Lee | ....................... | H05B 6/6458 219/707 |
| 5,891,497 | A * | 4/1999 | Bartasis | ............... | A23C 19/082 422/62 |
| 5,988,052 | A * | 11/1999 | Abler | ....................... | A01J 25/11 118/13 |
| 6,026,740 | A * | 2/2000 | Abler | .................... | A01J 25/005 118/13 |
| 6,177,659 | B1 * | 1/2001 | Yagi | ....................... | A47J 27/04 219/490 |
| 6,387,801 | B1 * | 5/2002 | Lee | .................... | C23C 18/1619 118/690 |
| 8,271,139 | B2 * | 9/2012 | Bellafiore | ............ | G05D 11/139 700/265 |
| 8,963,564 | B2 * | 2/2015 | Park | ....................... | G01N 27/06 324/672 |
| 2009/0213097 | A1 * | 8/2009 | Lin | ....................... | H03L 7/0814 345/204 |
| 2009/0242493 | A1 * | 10/2009 | Samborn | .................. | C02F 1/008 210/767 |
| 2011/0140704 | A1 * | 6/2011 | Son | ......................... | G01N 27/06 324/441 |
| 2011/0253693 | A1 * | 10/2011 | Lyons | ...................... | A47J 27/00 219/209 |
| 2013/0201316 | A1 * | 8/2013 | Binder | ..................... | H04L 67/12 348/77 |
| 2013/0220143 | A1 * | 8/2013 | Fetterman | ........... | A47J 36/2405 99/330 |
| 2013/0334203 | A1 * | 12/2013 | Legatti | ................. | H05B 1/0261 219/509 |
| 2015/0057773 | A1 * | 2/2015 | Minvielle | ................ | G06F 16/00 700/90 |
| 2015/0149120 | A1 * | 5/2015 | Burkhardt | ................ | A47J 36/32 702/189 |

FOREIGN PATENT DOCUMENTS

| | | |
|---|---|---|
| CN | 102788768 A | 11/2012 |
| EP | 1239703 A2 | 9/2002 |
| EP | 1602913 A1 | 12/2005 |
| EP | 1782717 A2 | 5/2007 |
| JP | 8-178299 A | 7/1996 |
| JP | 11-187824 A | 7/1999 |
| JP | 2000-155096 A | 6/2000 |
| JP | 2009-230966 A | 10/2009 |
| JP | 2012-102884 A | 5/2012 |
| KR | 10-2006-0014154 A | 2/2006 |
| KR | 10-2010-0116516 A | 11/2010 |
| KR | 10-1439433 B1 | 9/2014 |
| WO | 2014/009280 A2 | 1/2014 |

OTHER PUBLICATIONS

Communication dated Dec. 21, 2017, from the European Patent Office in counterpart European Application No. 16743666.6.

Communication dated Jul. 23, 2019, from the State Intellectual Property Office of People's Republic of China in counterpart Application No. 201680007669.0.

Communication dated Oct. 21, 2019 by the European Patent Office in counterpart European Patent Application No. 16743666.6.

Communication dated Mar. 18, 2020 issued by the State Intellectual Property Office of P.R. China in counterpart Chinese Application No. 201680007669.0.

Communication dated Sep. 28, 2020, from the State Intellectual Property Office of People's Republic of China in counterpart Application No. 201680007669.0.

Communication dated Feb. 17, 2021 issued by the Korean Patent Office in application No. 10-2015-0028347.

* cited by examiner

| FIRST STANDARD STATE | 0.9 % |
|---|---|
| SECOND STANDARD STATE | 1.0 % |
| THIRD STANDARD STATE | 1.1 % |

| RARE STATE | 0.7 % |
|---|---|
| MEDIUM STATE | 0.8 % |
| WELL-DONE STATE | 1.0 % |

COOKING APPLIANCE AND METHOD FOR CONTROLLING THE SAME

CROSS-REFERENCE TO RELATED APPLICATIONS

This application claims priority from Korean Patent Application No. 10-2015-0013893, filed on Jan. 28, 2015, and Korean Patent Application No. 10-2015-0028347, filed on Feb. 27, 2015, in the Korean Intellectual Property Office, the disclosures of which are incorporated herein by reference in their respective entireties.

BACKGROUND

1. Field

Disclosed herein are a cooking appliance which cooks an object to be heated and a method for controlling the same.

2. Description of the Related Art

A cooking appliance is an apparatus that cooks food by applying heat to the food. The cooking appliance may be classified into various products, such as an oven, a microwave oven, and the like in accordance with a method for applying heat to food.

Since the cooking appliance cooks an object to be heated by generating heat in accordance with a set heating value for an amount of time which is set by a user, it is difficult for the user of the cooking appliance to accurately recognize the progress in cooking the object to be heated.

SUMMARY

Therefore, it is an aspect of one or more exemplary embodiments to provide a cooking appliance which is capable of determining a cooked state of an object to be heated and a method for controlling the same.

Additional aspects of the exemplary embodiments will be set forth in part in the description which follows and, in part, will be apparent from the description, or may be learned by practice of the exemplary embodiments.

According to an aspect, a cooking appliance may include a heat source; a concentration sensor configured for detecting a concentration of a reference substance within which respective proportional amounts of ingredients change in accordance with a cooking progress which relates to an object to be heated; a controller configured for determining a cooked state of the object based on the detected concentration of the reference substance, and for controlling the heat source based on the determined cooked state of the object; and a communicator configured for transmitting, to an external device, information which indicates the determined cooked state of the object.

In addition, the concentration sensor may further include a salinity sensor configured for detecting a salinity of the object.

In addition, the salinity sensor may include a plurality of electrodes which are spaced apart from each other and configured to come in contact with the object; and a current sensor configured for detecting a current flowing in the object when a voltage is applied to at least one electrode from among the plurality of electrodes.

In addition, the salinity sensor may include at least one light source configured for radiating light toward the object; and at least one light detector configured for detecting scattered light generated by the reference substance. In particular, the at least one light source may radiate ultraviolet rays, and the at least one light detector may be provided at an upper portion of a cooking compartment in which the object is cooked.

In addition, the controller may be further configured to determine whether the cooked state of the object is a finished state based on the detected concentration of the reference substance. In addition, the controller may be further configured to determine that the cooked state of the object is the finished state when the detected concentration of the reference substance reaches a preset finished cooking concentration, or when a change in the detected concentration of the reference substance becomes equal to or less than a preset critical value.

In addition, when the detected concentration of the reference substance corresponds to a preregistered standard cooked state, the controller may be further configured to control the communicator to transmit information which indicates that the preregistered standard cooked state has been reached. In particular, the controller may be further configured to predict a change in the cooked state of the object, and to generate the information which indicates that the standard cooked state has been reached based on the predicted change in the cooked state and a current cooked state of the object.

In addition, the controller may be further configured to control the communicator to transmit an error message to an external device when an initial concentration of the reference substance deviates from a preset critical range.

In addition, the controller may be further configured to determine a method for cooking an object to be heated based on a type of the object to be heated. In particular, the cooking appliance may further include a camera configured for obtaining an image of an object to be heated, and the controller may be further configured to determine the type of the object based on the image of the object.

In addition, the controller may be further configured to adjust the method for cooking an object based on the detected initial concentration of the reference substance and the weight of the object.

In addition, the controller may be further configured to adjust the method for cooking an object to be heated based on information received from a user.

In addition, the controller may be further configured to determine at least one from among an overcooked state and an undercooked state based on the detected concentration of the reference substance.

Further, the cooking appliance may further include a steam generator configured for providing moisture to an object to be heated, and the controller may be further configured to control the steam generator to provide moisture to the object when the detected salinity of the object is higher than a predetermined critical salinity.

According to an aspect, a method for controlling a cooking appliance, which includes a concentration sensor configured for detecting a concentration of a reference substance within which respective proportional amounts of ingredients change in accordance with a cooking progress with respect to an object to be heated; and a communicator configured for transmitting, to an external device, information which indicates a cooked state of the object, may include heating the object; determining a cooked state of the object based on the concentration of the reference substance detected in the concentration sensor; and transmitting the information which indicates the cooked state to the external device.

In addition, the determining the cooked state may include determining whether the cooked state of the object is a finished state based on the detected concentration of the reference substance.

In addition, the determining whether the cooked state is the finished state may comprise determining that the cooked state of the object is the finished state when the detected concentration of the reference substance reaches a preset finished cooking concentration, or when a change in the detected concentration of the reference substance becomes equal to or less than a preset critical value.

In addition, the determining the cooked state may include determining that an object to be heated is in a preset standard cooked state when the detected concentration of the reference substance corresponds to a preregistered standard cooked state; and predicting a change in the cooked state of the object, and generating information which indicates that the standard cooked state has been reached based on the predicted change in the cooked state and a current cooked state of the object.

Further, the method for controlling the cooking appliance may further include determining a method for cooking an object to be heated based on a type of the object.

In addition, the determining the cooking method may include adjusting the determined cooking method by using at least one from among the weight of the object, information received from a user, and the detected concentration of the reference substance.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
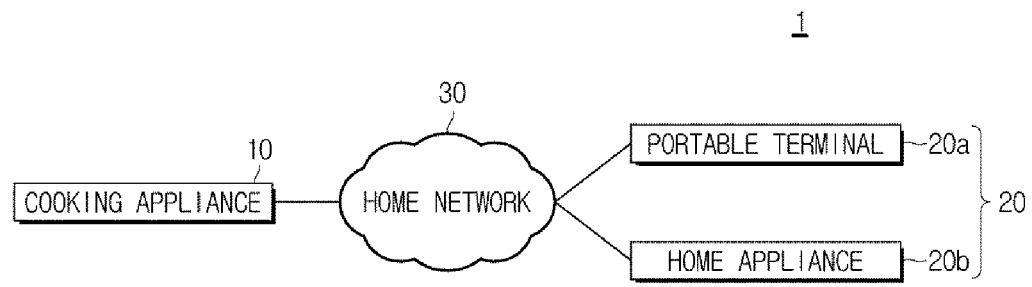
FIG. 1 is a view illustrating a home network system, according to an exemplary embodiment.

Advantages, characteristics, and methods for achieving the same will become apparent by referring to exemplary embodiments as described below with reference to the accompanying drawings. However, the present inventive concept is not limited to the exemplary embodiments which are disclosed hereinafter, and may be implemented in various different ways. The present exemplary embodiments are provided only to make the disclosure of the present inventive concept complete and completely inform those of ordinary skill in the art, to which the present inventive concept pertains, of the scope of the present inventive concept, and the present inventive concept is defined only by the scope of appended claims.

General terms which are widely being used now were selected as terms used in the present disclosure while considering functions in the exemplary embodiments, but the terms may vary in accordance with intentions or cases of technical experts who are engaged in the field, the advent of a new technology, etc. In addition, some terms were arbitrarily selected by an applicant in particular cases, and the meaning of the terms will be described in detail in corresponding parts in the "detailed description" section in such cases. Consequently, the terms used in the present disclosure should be defined based on the meanings of the terms and content throughout the present disclosure instead of being simply defined by the names of the terms.

When it is said that a certain part "includes" a certain component throughout the specification, it signifies that the part may further include other components instead of excluding other components unless particularly mentioned otherwise. In addition, terms such as "part", "module", "unit", and the like that are used in the specification signify a unit for processing at least one function or step, and may be implemented by any of software, hardware components such as a field-programmable gate array (FPGA) or an application-specific integration circuit (ASIC), or a combination of software and hardware. However, meanings of the terms such as "part", "module", "unit", and the like are not limited to software or hardware. The "part", "module", "unit", and the like may be configured to reside in an addressable storage medium or configured to playback one or more processors. Consequently, as an example, the terms such as "part", "module", "unit, and the like include components such as software components, object-oriented software components, class components, and task components, processes, functions, attributes, procedures, subroutines, segments of a program code, drivers, firmware, a microcode, a circuit, data, a database, data structures, tables, arrays, and variables.

In addition, terms including ordinals such as "first", "second", and so on may be used to describe various components, but the components are not limited by the terms. The terms are used only for differentiating one component from other components.

Hereinafter, exemplary embodiments will be described in detail with reference to the accompanying drawings to enable those of ordinary skill in the art to which the present inventive concept pertains to easily practice the present inventive concept. In addition, parts which are not related to the description will be omitted in the drawings for clear description.

Hereinafter, a home network system, a cooking appliance, and a method for controlling the same according to an exemplary embodiment will be described in detail with reference to the accompanying drawings.

Figure 2:
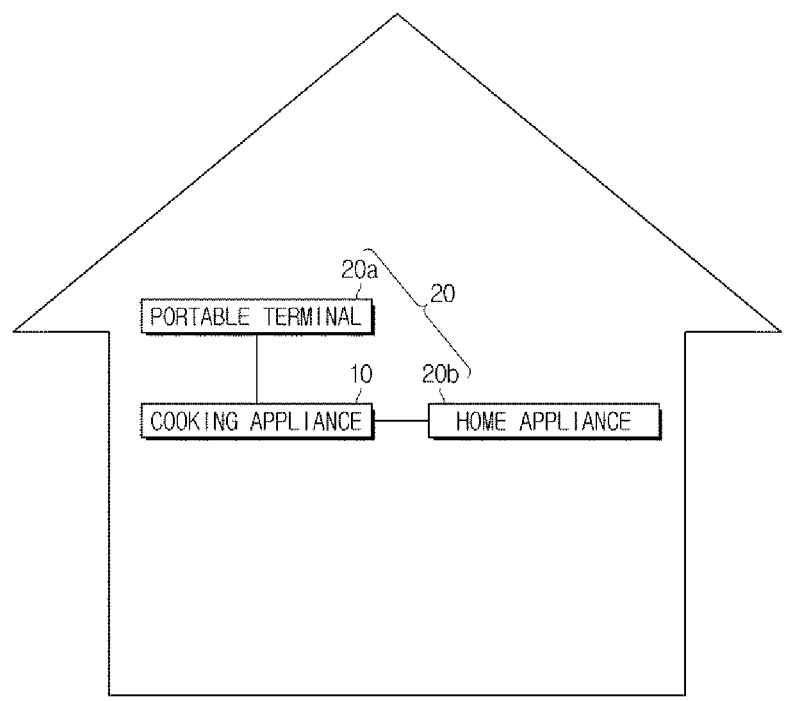
FIG. 2 is a view illustrating an exemplary embodiment of the home network.
Figure 3:
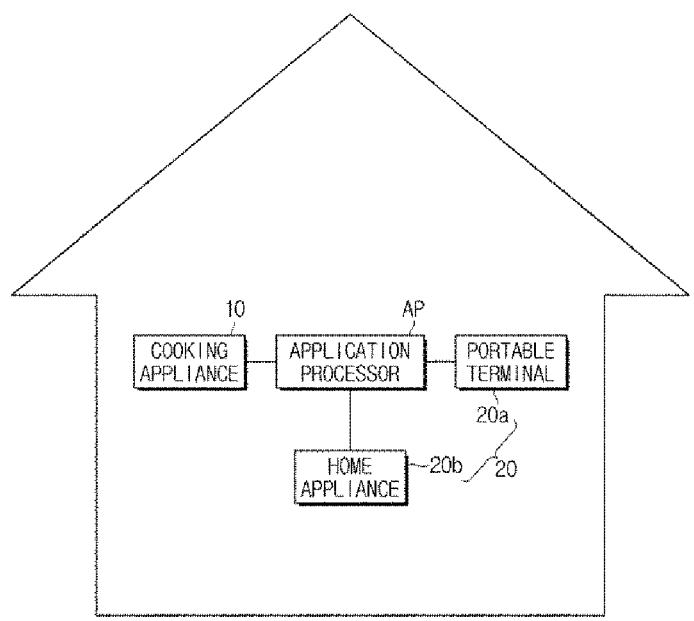
FIG. 3 is a view illustrating another exemplary embodiment of the home network.
Figure 4:
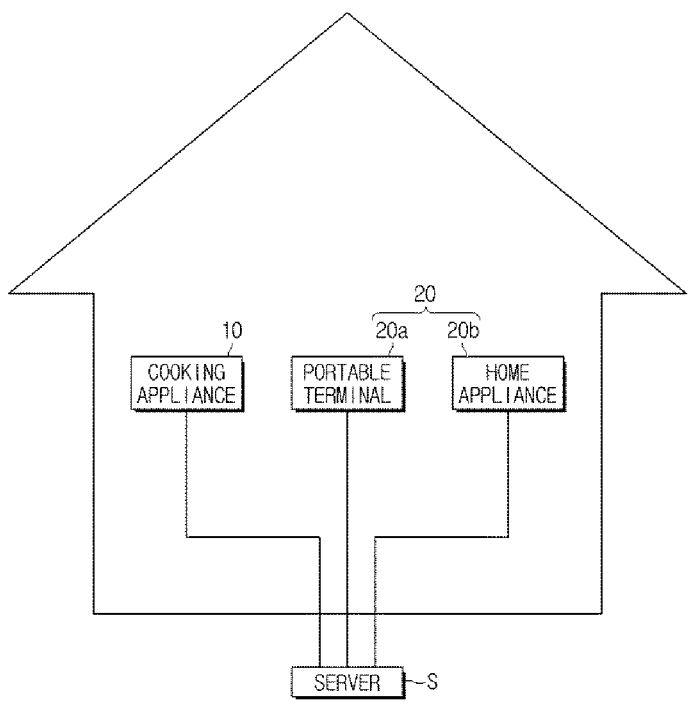
FIG. 4 is a view illustrating still another exemplary embodiment of the home network.

FIG. 1 is a view illustrating a home network system according to an exemplary embodiment, FIG. 2 is a view illustrating an exemplary embodiment of a home network, FIG. 3 is a view illustrating another exemplary embodiment of the home network, and FIG. 4 is a view illustrating still another exemplary embodiment of the home network.

Referring to FIG. 1, a home network system 1 according to an exemplary embodiment includes a cooking appliance 10, and an external device 20 connected to the cooking appliance 10 via a home network 30.

The cooking appliance 10 may cook an object to be heated by heating the object to be heated. The object to be heated may be food to be cooked.

The cooking appliance 10 is an apparatus that heats and cooks an object to be heated, and, for example, may be any one of a gas oven or a gas range that burns gas to cook an object to be heated, an electric oven or an induction heater that uses electricity to cook an object to be heated, a steam cooker that uses hot vapor to cook an object to be heated, a microwave oven that uses electromagnetic waves to cook an object to be heated, and a cooking container that accommodates an object to be heated to cook the object to be heated by an external heat source, but it should be understood that the cooking appliance 10 is not limited thereto and includes every apparatus that is capable of cooking an object to be heated.

The external device 20 may be connected to the cooking appliance 10 via the home network 30 in order to receive information from the cooking appliance 10 or transmit information to the cooking appliance 10.

The external device 20 may include a portable terminal 20a and a home appliance 20b. The portable terminal 20a may include, for example, a portable information processor such as a portable media player (PMP), a personal digital assistant (PDA), a tablet personal computer (PC), a laptop, a smartphone, and the like, but is not limited thereto, and any device capable of communicating with the cooking appliance 10 via the home network 30 may function as the portable terminal.

The home appliance 20b signifies various types of appliances that may be used at home, and may be an appliance such as a refrigerator, a television (TV), a robot cleaner, a washing machine, and the like, but is not limited thereto, and any device capable of communicating with the cooking appliance 10 via the home network 30 may function as the home appliance 20b.

The cooking appliance 10 and the external device 20 are connected via the home network 30. As shown in FIG. 2, the cooking appliance 10 and the external device 20 may be directly connected to form the home network 30.

In addition, as shown in FIG. 3, the cooking appliance 10 and the external device 20 may be connected via an application processor (AP) to form the home network 30.

In addition, as shown in FIG. 4, the cooking appliance 10 and the external device 20 may form the home network 30 via a server S provided at a remote place. In particular, in order to form the home network 30, the server S provided at the remote place may store information for communication linkage between the cooking appliance 10, the portable terminal 20a, and the home appliance 20b, and may form the home network 30 by using the stored information.

Figure 5:
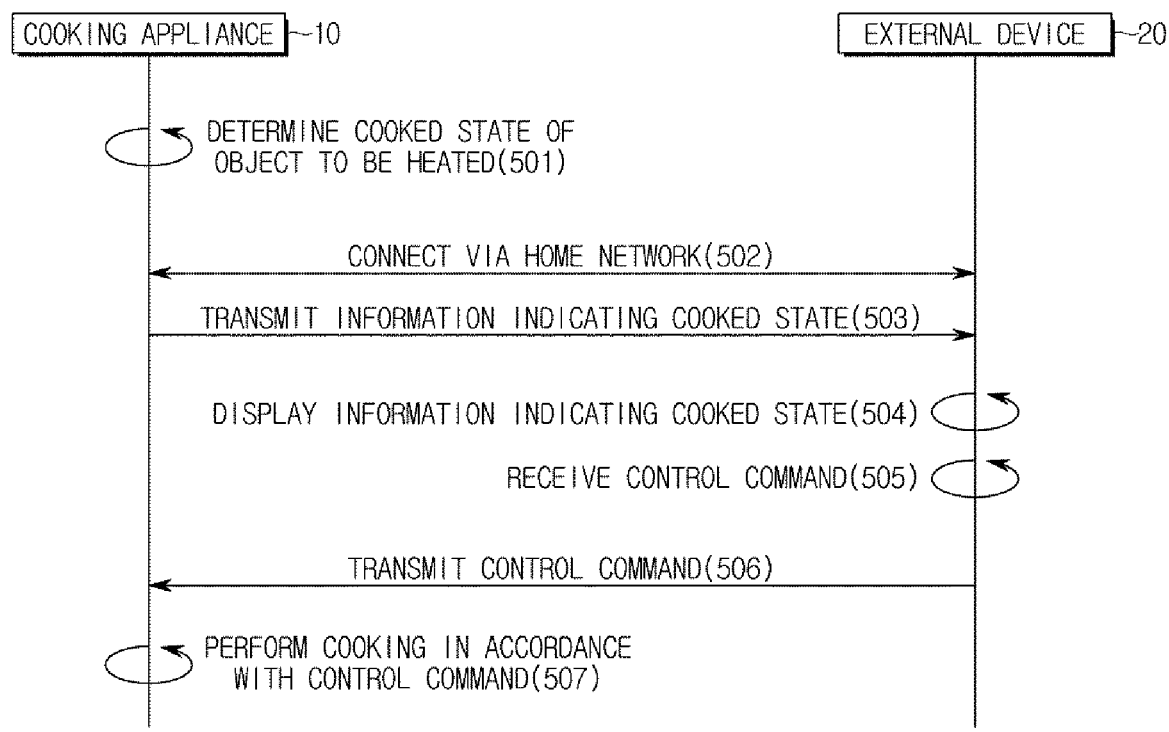
FIG. 5 is a sequence diagram for describing the overall operation of the home network system, according to an exemplary embodiment.

FIG. 5 is a sequence diagram for describing the overall operation of the home network system 1, according to an exemplary embodiment.

In operation 501, the cooking appliance 10 determines a cooked state of an object to be heated. The cooked state relates to cooking progress with respect to cooking the object to be heated, and, for example, may include one from among whether cooking is finished, an amount of time remaining until cooking is finished, whether the object to be heated is overcooked, and whether the object to be heated is undercooked.

The cooked state may be determined in accordance with a change in concentration of a reference substance. The reference substance is a substance for which the concentration (i.e., a respective proportional amount of the substance as compared with other substances included in the object to be heated) changes as cooking an object to be heated progresses. Hereinafter, the reference substance is described to be salt for convenience of description, but the reference substance is not limited thereto, and any substance may be the reference substance as long as the concentration thereof changes as the cooking of the object to be heated progresses.

In addition, the cooked state may be determined based on a respective concentration of each of a plurality of reference substances.

Figure 6A:
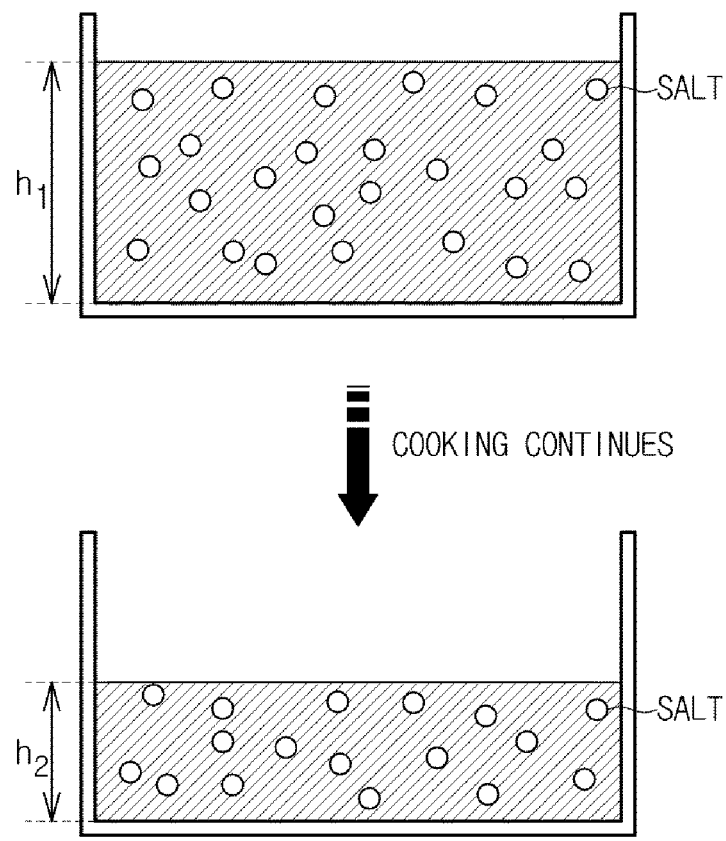
FIG. 6A is a view for describing a change in salt content as cooking continues.
Figure 6B:
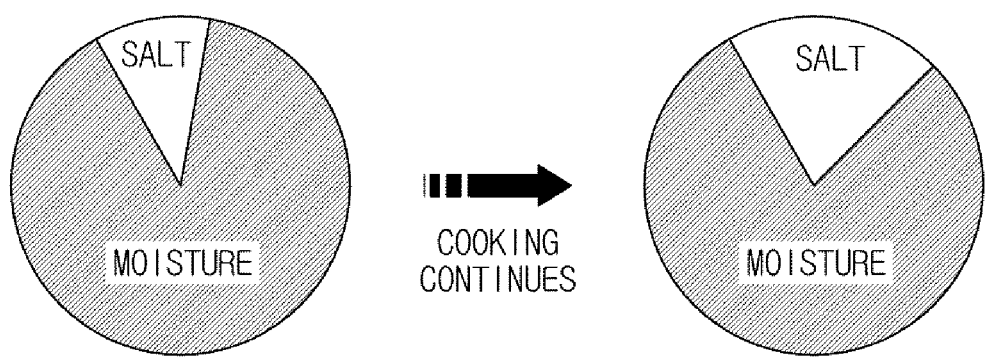
FIG. 6B is a view illustrating changes in moisture content and salt content as cooking continues.

FIG. 6A is a view for describing a change in salinity as cooking progresses, and FIG. 6B is a view illustrating changes in moisture content and salt content as cooking progresses.

Referring to FIGS. 6A and 6B, moisture content included in an object to be heated evaporates as cooking progresses, but salt content included in the object to be heated does not change. In this aspect, the moisture content included in the object to be heated evaporates as the object to be heated is heated, but the amount of salt content included in the object to be heated stays about the same.

Therefore, as shown in FIG. 6B, the percentage (i.e., proportional amount) of salt content gradually increases as cooking progresses, thereby causing the salinity of the object to be heated to gradually increase as cooking progresses.

As above, the cooking appliance 10 may determine the cooked state of the object to be heated based on the change in the salinity. A specific method for determining the cooked state will be described in detail below. Referring again to FIG. 5, in operation 502, the cooking appliance 10 is connected to the external device 20 via the home network 30. The external device 20 connected via the home network 30 may be a preset one, but is not limited thereto.

In addition, a method for connecting the home network 30 may vary based on a type of the external device 20. For example, the home network 30 may be connected via a wireless fidelity (Wi-Fi) communication method when the external device 20 is capable of Wi-Fi communication only, and the home network 30 may be connected via a wired communication method when the external device 20 is capable of wired communication only. In operation 503, the cooking appliance 10 transmits, to the external device 20, information which indicates a cooked state of an object to be heated. In particular, the transmitted information which indicates the cooked state of the object to be heated may be included within any of a text message, a voice message, or visual information.

In operation 504, the external device 20 displays the information which indicates a cooked state that has been received from the cooking appliance 10, and in operation 505, the external device 20 receives a control command from a user. The information which indicates the cooked state may be provided to the user via either or both of a display and a speaker of the external device 20. In this aspect, the information which indicates the cooked state may include any of whether cooking is finished, an amount of time remaining until cooking is finished, whether an object to be heated is overcooked, and whether the object to be heated is undercooked.

Figure 7:
FIG. 7 is an illustrative view of a screen for displaying information which indicates a finished cooking state.
Figure 8:
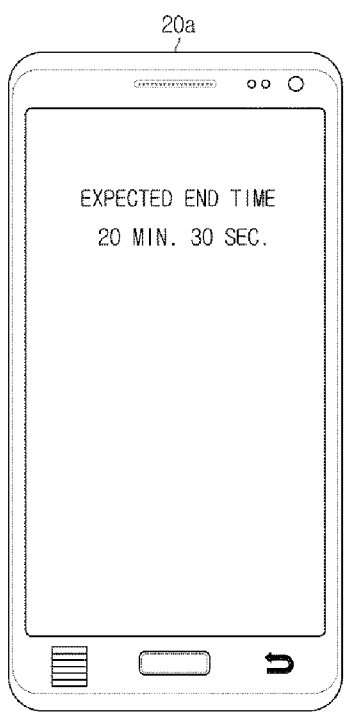
FIG. 8 is an illustrative view of a screen for displaying information which indicates cooking progress.
Figure 9:
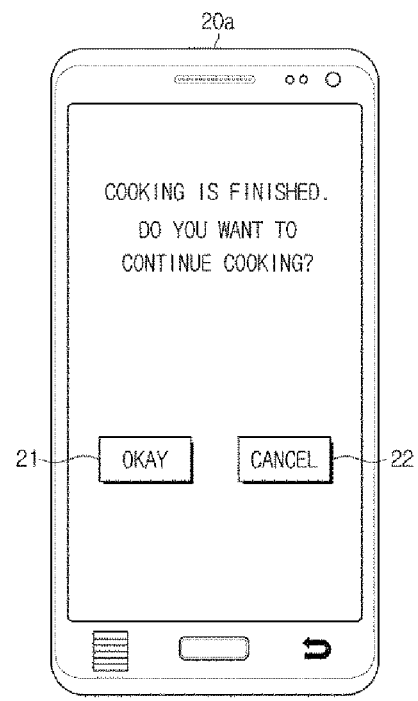
FIG. 9 is an illustrative view of a screen for displaying information which indicates an overcooked state.
Figure 10:
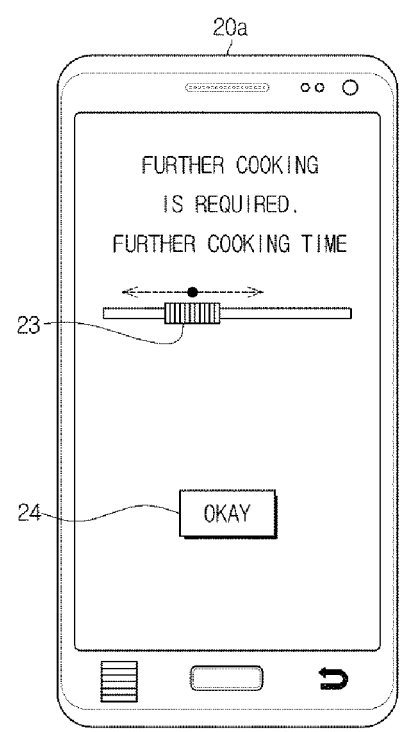
FIG. 10 is an illustrative view of a screen for displaying information which indicates an undercooked state.

FIG. 7 is an illustrative view of a screen for displaying information which indicates a finished cooking state, FIG. 8 is an illustrative view of a screen for displaying information which indicates cooking progress, FIG. 9 is an illustrative view of a screen for displaying information which indicates an overcooked state, and FIG. 10 is an illustrative view of a screen for displaying information which indicates an undercooked state.

For example, the external device 20 may display a screen shown in FIG. 7 in order to display information which indicates a finished state of cooking to a user. In addition, the external device 20 may display a screen shown in FIG. 8 in order to display information related to cooking progress, specifically, an amount of time remaining until cooking is finished.

In addition, as shown in FIG. 9, the external device 20 may display information which indicates an overcooked state. The overcooked state represents a state in which the cooking appliance 10 continues cooking even if cooking an object to be heated has been finished, and the external device 20 may display a message to the user which indicates that cooking of the object to be heated has been finished.

In particular, the external device 20 may display a second icon 22 for enabling a user to transmit a command to end cooking, together with a first icon 21 for enabling the user to transmit a command to continue cooking. When the user selects the second icon 22, the external device 20 transmits an end cooking command to the cooking appliance.

In addition, as shown in FIG. 10, the external device 20 may display information which indicates an undercooked state. The undercooked state represents a state of requiring further cooking of an object to be heated, and the external device 20 may display information which indicates that further cooking is required.

In this aspect, the external device 20 may display a third icon 23 for enabling a user to set a further cooking time together with a fourth icon 24 for enabling the user to transmit a start cooking command. The user may adjust the third icon 23 to the left and right in order to set the further cooking time, and select the fourth icon 24 to input the start cooking command in accordance with the further cooking time.

Referring again to FIG. 5, in operation 506, when a control command is received from the user via the above-described method, the external device 20 transmits the control command input by the user to the cooking appliance 10, and the cooking appliance 10 then performs cooking in accordance with the received control command in operation 507. For example, the cooking appliance 10 may end cooking or perform further cooking in accordance with the control command.

Hereinafter, the cooking appliance 10 included in the home network system 1 according to an exemplary embodiment will be described in detail.

Figure 11A:
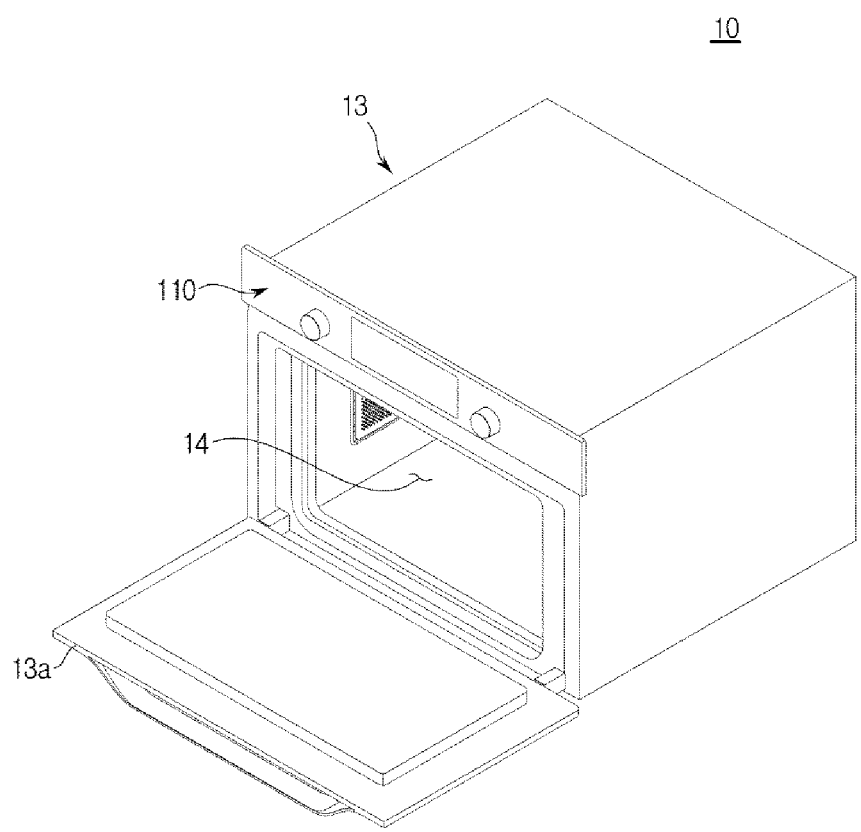
FIG. 11A is a view schematically illustrating an exterior of a cooking appliance 10 which is included in the home network, according to an exemplary embodiment.
Figure 11B:
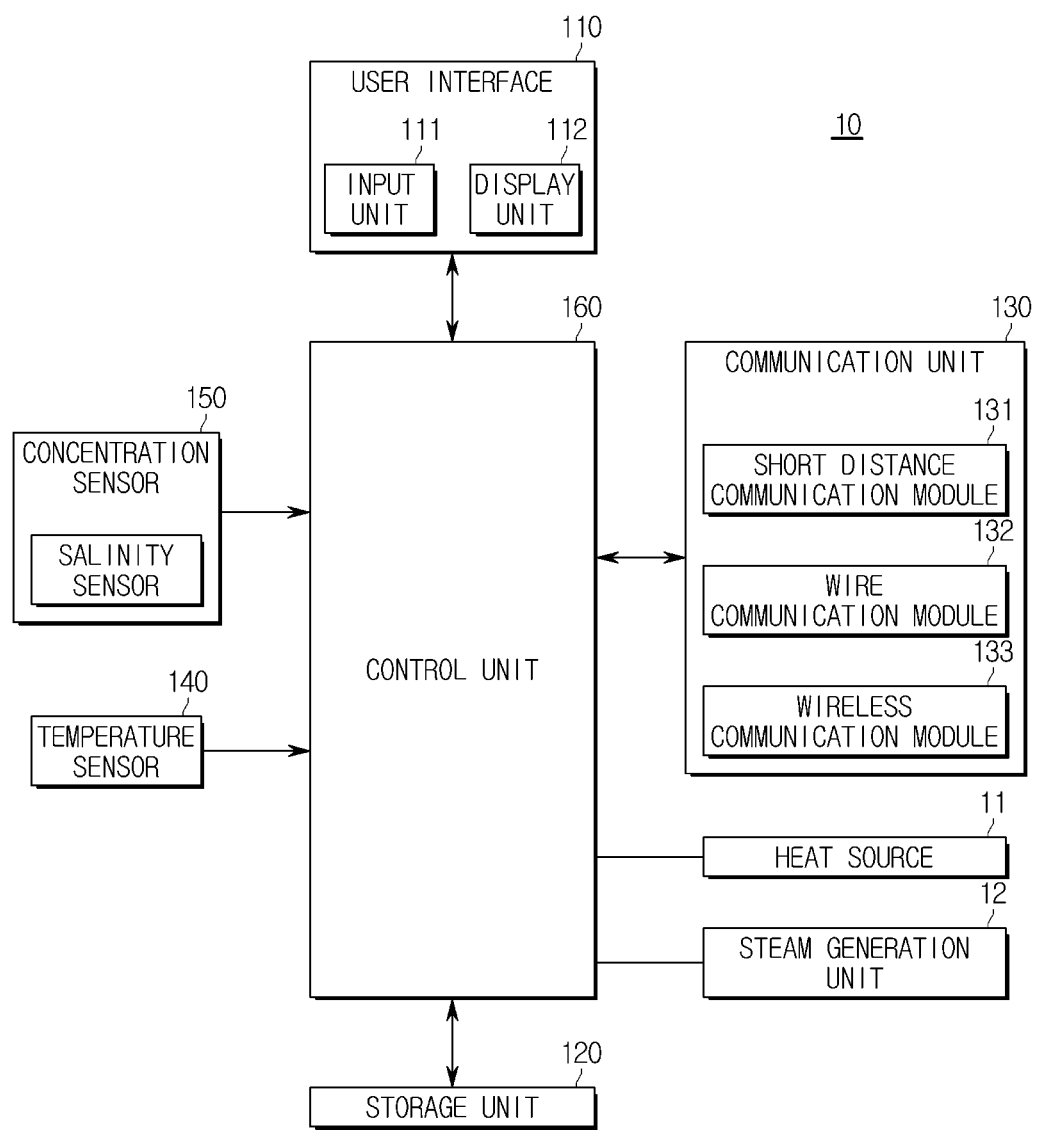
FIG. 11B is a control block diagram of a cooking appliance which is included in the home network system, according to an exemplary embodiment.

FIG. 11A is a view schematically illustrating an exterior of a cooking appliance 10 which is included in a home network according to an exemplary embodiment, and FIG. 11B is a control block diagram of the cooking appliance 10 which is included in the home network system 1 according to an exemplary embodiment.

Referring to FIG. 11A, the cooking appliance 10 includes a main body 13 which forms an exterior of the cooking appliance 10. The main body 13 may be substantially box shaped with an open front portion, and the opening at the front portion of the main body may be opened and closed by using a door 13a.

A cooking compartment 14 is provided in the main body 13. The cooking compartment 14 is a space in which an object to be heated is accommodated and cooked.

In particular, as shown in FIG. 11B, the cooking appliance 10 may include a user interface 110, a storage unit (also referred to herein as a "storage device" and/or as a "storage") 120, a communication unit (also referred to herein as a "communicator") 130, a temperature sensor 140, and a concentration sensor 150.

The user interface 110 may receive the control command from the user and/or display information related to an operation of the home appliance 20b.

The user interface 110 may be provided at a front surface of the cooking appliance 10 and configured to receive input which relates to a cooking method from the user, and may display a cooked state of an object to be heated. For example, the user interface 110 may receive an input which relates to a cooking time from the user, and may display, to the user, an amount of time remaining until cooking is finished.

In particular, the user interface 110 may include an input unit 111 which is configured for facilitating an input of a control command of a user, and a display unit 112 which is configured for displaying information related to the cooking appliance 10.

The input unit 111 may be implemented by a button input means, such as a push button or a membrane button, and/or a touch input means, such as a touch pad, but the input means is not limited thereto.

The display unit 112 may be implemented by a display means, such as a plasma display panel (PDP), a liquid crystal display (LCD) panel, a light emitting diode (LED) panel, or an organic light emitting diode (OLED) panel, and an active-matrix organic light-emitting diode (AMOLED) panel, but the display means is not limited thereto.

The storage unit 120 stores data required for operating the cooking appliance 10. For example, the storage unit 120 may store an operating system and a program required for operating the cooking appliance 10, and/or store data generated as a result of an operation of the cooking appliance 10. In addition, the storage unit 120 may store user information related to a user.

The storage unit 120 may include any of a high-speed random access memory, a magnetic disk, a static random access memory (SRAM), a dynamic random access memory (DRAM), a read-only memory (ROM), and the like, but it is not limited thereto. In addition, the storage unit 120 may be detachable from an apparatus. For example, the storage unit 120 may include a compact flash (CF) card, a secure digital (SD) card, a smart media (SM) card, a multimedia card (MMC), or a memory stick, but it is not limited thereto. The communication unit 130 transmits and receives data to and from the external device 20.

In particular, the communication unit 130 may be connected to the external device 20 via the home network 30 in order to transmit cooked state information to the external device 20 or to receive a control command from the external device 20.

In addition, the communication unit 130 may include at least one of a short distance communication module 131, a wired communication module 132, and a wireless communication module 133 configured to communicate with the external device 20.

The wired communication module 132, for example, may form the home network with the external device 20 via any of a peripheral component interconnect (PCI), a PCI-express, a Universal Serial Bus (USB), an unshielded twisted pair (UTP) cable, and the like.

The short distance communication module 131 may form the home network with the external device 20 via any of various short distance communication methods such as Bluetooth, Bluetooth low energy, infrared data association (IrDA), Zigbee, Wi-Fi, Wi-Fi direct, ultra wideband (UWB), or near field communication (NFC), and the like.

The wireless communication module 133, for example, may form the home network with the external device 20 via any of various wireless communication methods such as communication methods related to a global system for mobile communication (GSM)/$3^{rd}$ generation partnership project (3GPP) including GSM, high speed downlink packet access (HSDPA), and long term evolution (LTE)-advanced, communication methods related to 3GPP2 such as code division multiple access (CDMA), or WiMax.

The temperature sensor 140 measures a temperature. In particular, the temperature sensor 140 measures a temperature of an object to be heated or a space in which the object to be heated is accommodated, and transmits information which indicates the measured temperature to a control unit (also referred to herein as a "controller") 160. For example, the temperature sensor 140 may include a thermistor, which has an electrical resistance value that varies in accordance with the temperature, provided in the cooking compartment 14 in which cooking is performed.

FIGS. 12A to 12E are views for describing a contact type salinity sensor.

Figure 12A:
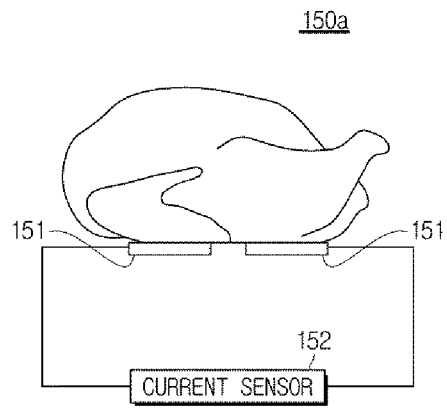
FIG. 12A is a view for describing a concept of a contact type salinity sensor.
Figure 12B:
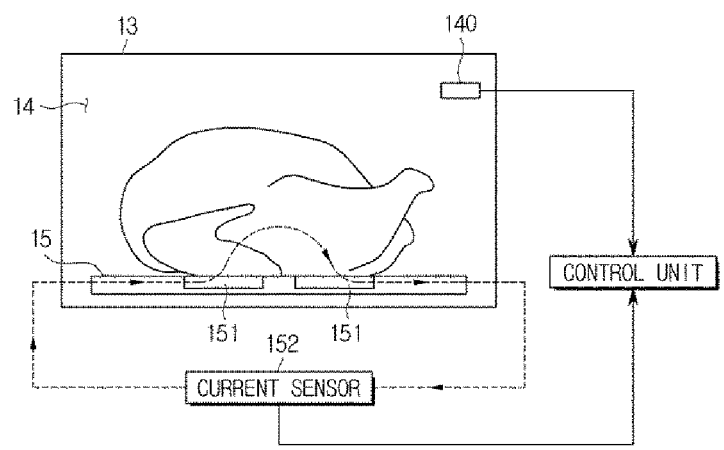
FIG. 12B is a view illustrating an exemplary embodiment of the contact type salinity sensor.
Figure 12C:
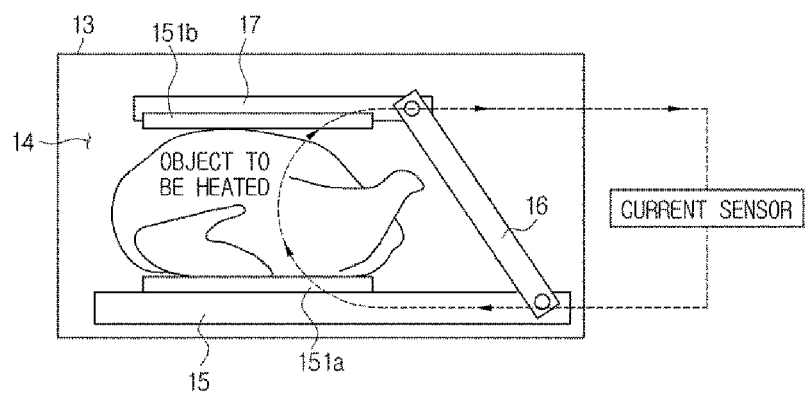
FIG. 12C is a view illustrating another exemplary embodiment of the contact type salinity sensor.
Figure 12D:
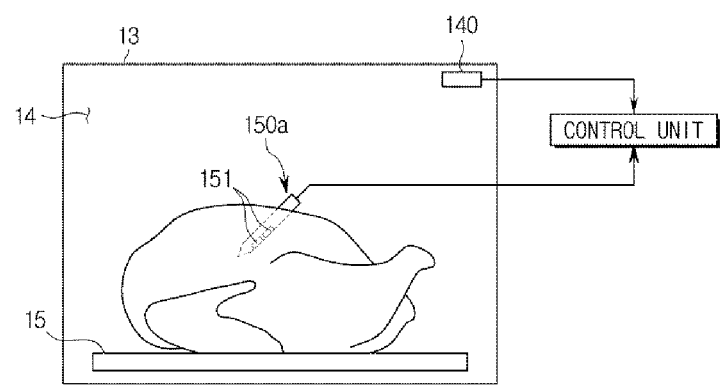
FIG. 12D is a view illustrating still another exemplary embodiment of the contact type salinity sensor.
Figure 12E:
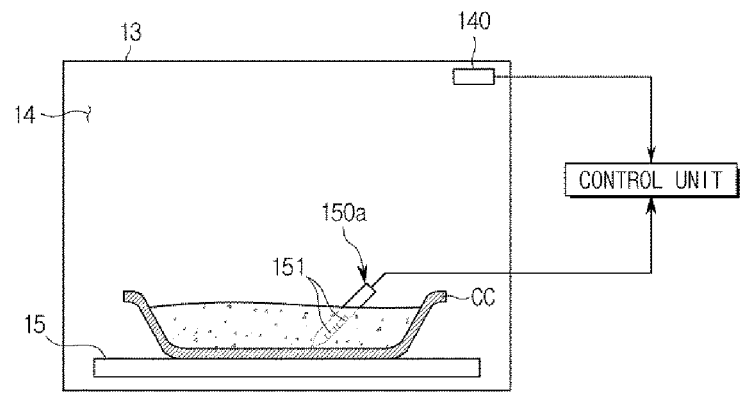
FIG. 12E is a view illustrating yet another exemplary embodiment of the contact type salinity sensor.

The concentration sensor 150 detects a concentration of a reference substance included in an object to be heated. The concentration sensor 150 may further include a salinity sensor for detecting the salinity of the object to be heated. The salinity sensor detects a percentage (i.e., proportional amount) of salt content included in the object to be heated. Hereinafter, the salinity sensor will be described in detail. FIG. 12A is a view for describing a concept of a contact type salinity sensor, FIG. 12B is a view illustrating an exemplary embodiment of the contact type salinity sensor, FIG. 12C is a view illustrating another exemplary embodiment of the contact type salinity sensor, FIG. 12D is a view illustrating still another exemplary embodiment of the contact type salinity sensor, and FIG. 12E is a view illustrating yet another exemplary embodiment of the contact type salinity sensor.

As shown in FIGS. 12A to 12E, a contact type salinity sensor 150a may detect the salinity of an object to be heated by coming in contact with the object to be heated.

As shown in FIG. 12A, the contact type salinity sensor 150a may include a plurality of electrodes 151 and a current sensor 152 electrically connected to the plurality of electrodes 151.

When the plurality of electrodes 151 are electrically connected via the object to be heated, current flows in the object to be heated when voltage is applied between the plurality of electrodes 151. The amount of current flowing in the object to be heated is proportional to the concentration of salt.

In particular, the magnitude of the current detected in the current sensor 152 becomes greater as the salinity of the object to be heated increases, and the magnitude of the current detected in the current sensor 152 becomes smaller as the salinity of the object to be heated decreases.

Therefore, the current sensor 152 is capable of measuring the salinity of the object to be heated in accordance with the current flowing in the object to be heated, and measuring the salinity of the object to be heated in accordance with a change in the current flowing in the object to be heated.

As shown in FIG. 12B, the plurality of electrodes 151 may be space apart from each other on a mounting unit 15 on which the object to be heated is mounted so as to be electrically connected via the object to be heated which is mounted on the mounting unit 15.

In addition, as shown in FIG. 12C, the plurality of electrodes 151 may be provided on different planes. In particular, a first electrode 151a may be provided on the mounting unit 15 on which the object to be heated is mounted, and a second electrode 151b may be provided at a rotary unit 17 which is connected to a connection member 16. In this aspect, one end of the connection member 16 is coupled to the mounting unit 15 by a hinge, and the other end of the connection member 16 is coupled to the rotary unit 17.

The first electrode 151a may come in contact with a lower portion of the object to be heated which is mounted on the mounting unit 15, and the second electrode 151b may move together with the rotary unit 17 toward the object to be heated so as to come in contact with an upper portion of the object to be heated. When both of the first electrode 151a and the second electrode 151b come in contact with the object to be heated as above, the first electrode 151a and the second electrode 151b are electrically connected via the object to be heated.

Further, as shown in FIGS. 12D and 12E, the contact type salinity sensor 150a may be provided in a shape that may be inserted into the object to be heated. In particular, the plurality of electrodes may be provided at a front end of the contact type salinity sensor 150a.

Figure 13A:
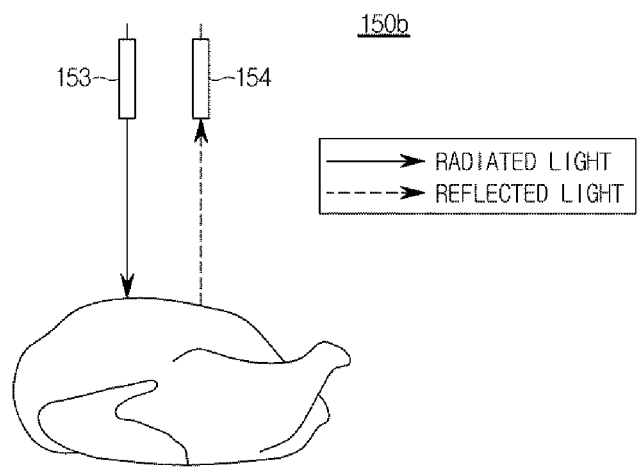
FIG. 13A is a view for describing a concept of a noncontact type salinity sensor.
Figure 13B:
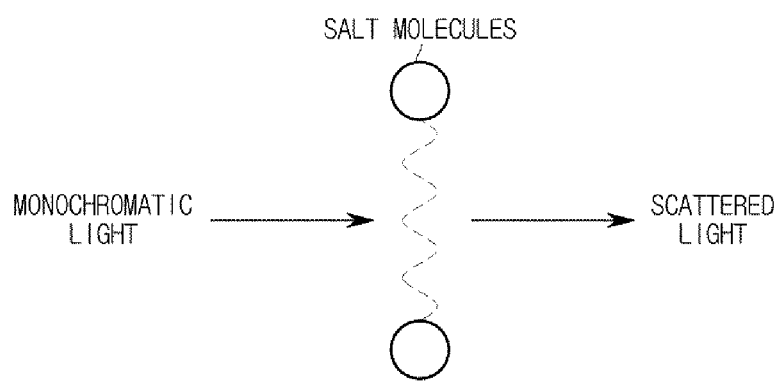
FIG. 13B is a view for describing the generation of scattered light in accordance with molecular vibration.
Figure 14A:
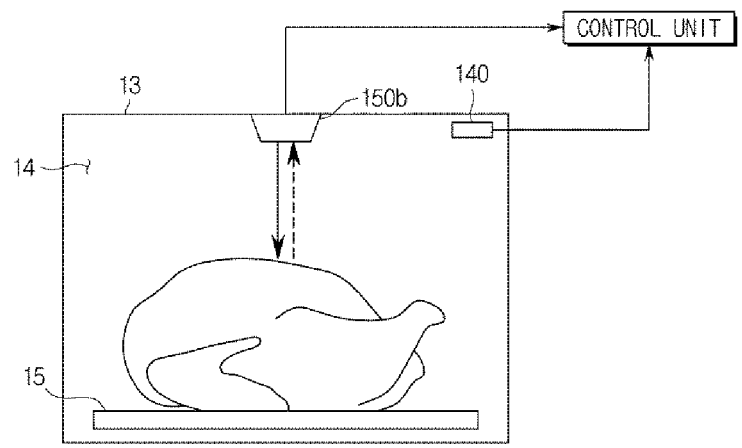
FIG. 14A is a view illustrating an exemplary embodiment of the noncontact type salinity sensor.
Figure 14B:
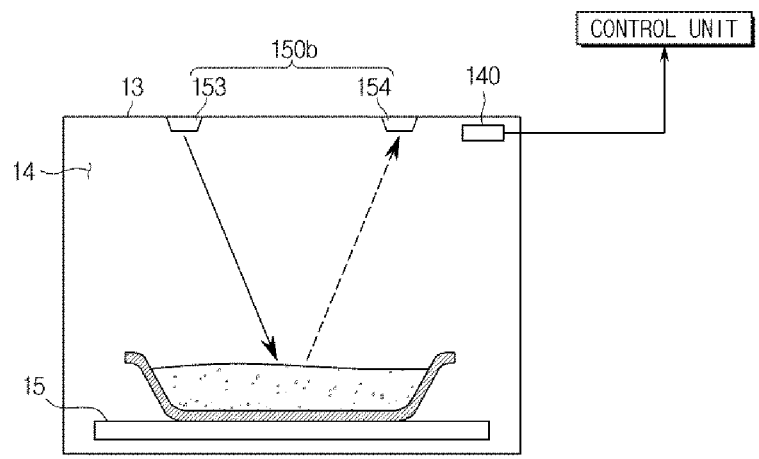
FIG. 14B is a view illustrating another exemplary embodiment of the noncontact type salinity sensor.
Figure 14C:
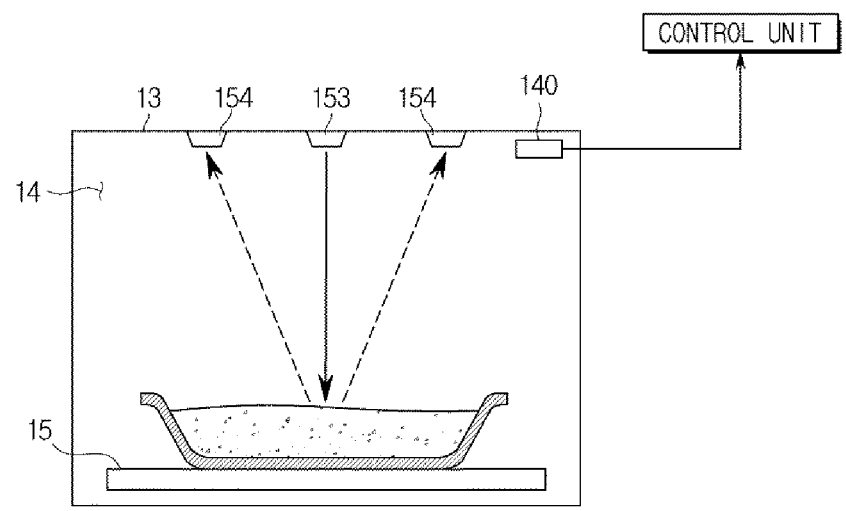
FIG. 14C is a view illustrating still another exemplary embodiment of the noncontact type salinity sensor.

FIG. 13A is a view for describing a concept of a noncontact type salinity sensor, FIG. 13B is a view for describing the generation of scattered light in accordance with molecular vibration, FIG. 14A is a view illustrating an exemplary embodiment of the noncontact type salinity sensor, FIG. 14B is a view illustrating another exemplary embodiment of the noncontact type salinity sensor, and FIG. 14C is a view illustrating still another exemplary embodiment of the noncontact type salinity sensor.

As shown in FIG. 13A, a noncontact type salinity sensor 150b may detect the salinity of an object to be heated without coming into physical contact with the object to be heated. The salinity sensor may include a light source 153 which is configured for radiating light toward the object to be heated, and a detector 154 which is configured for detecting scattered light reflected from the object to be heated. The detector 154 may measure the salinity of the object to be heated by detecting the scattered light.

As shown in FIG. 13B, when monochromatic light is radiated toward vibrating molecules, a part of the radiated monochromatic light is scattered by the molecular vibration. A relative number of salt molecules increases as salinity becomes higher, and a distance between the salt molecules becomes closer as the relative number of the salt molecules increases, thereby generating more scattered light.

In particular, since the amount of the scattered light caused by the vibration of the salt molecules becomes greater as the salinity becomes higher, the detector 154 may detect the salinity by using the scattering phenomenon caused by the salt molecules. Specifically, the light source 153 radiates monochromatic light toward the object to be heated. In this aspect, the monochromatic light represents light having a wavelength which falls within a predetermined range, and may include, for example, infrared light.

The detector 154 receives light reflected from the object to be heated and analyzes a spectrum of the received light. The scattered light may be detected via the spectral analysis as above. In addition, the detector 154 may measure the salinity of the object to be heated by using the amount of scattered light.

More particularly, the detector 154 analyzes a wavelength of the received light via the spectral analysis, calculates the amount of the scattered light which has a different wavelength from the monochromatic light radiated from the light source 153, and detects the salinity of the object to be heated in accordance with the amount of the scattered light.

Since the salinity of the object to be heated may be measured without direct physical contact with the object to be heated if the noncontact type salinity sensor 150b is used as above, sanitary cooking is possible. In addition, since the salinity is measured in a noncontact way, the damage to an exterior of the object to be heated which might otherwise be caused by the salinity measurement may be prevented.

The noncontact type salinity sensor 150b may be provided at an upper portion of the cooking compartment 14 to measure the salinity of the object to be heated not only when the object to be heated is directly mounted on the mounting unit 15 and cooked as shown in FIG. 14A, but also when the object to be heated is accommodated in a separate cooking container and cooked, as shown in FIG. 14B.

In particular, the noncontact type salinity sensor 150b may be provided at the upper portion of the cooking compartment 14 in order to measure the salinity of a soup dish which is accommodated in the cooking container and cooked. More particularly, the noncontact type salinity sensor 150b may be provided on a ceiling of the cooking compartment 14, as shown in FIGS. 14A and 14B, in order to radiate monochromatic light toward the object to be heated and detect scattered light reflected from the object to be heated.

Although it is shown in FIG. 14A that the light source 153 and the detector 154 are provided near each other, positions of the light source 153 and the detector 154 are not limited thereto.

For example, the light source 153 and the detector 154 may be provided spaced apart from each other as shown in FIG. 14B, and the light source 153 and the detector 154 may be provided at an upper end of a side wall of the cooking compartment 14.

In addition, the noncontact type salinity sensor 150b may include a plurality of detectors 154, as shown in FIG. 14C. The amount of reflected light incident on the detector 154 may vary in accordance with a surface condition of the object to be heated.

Since the amount of the detected scattered light also varies when the amount of the reflected light incident on the detector 154 varies in accordance with the surface condition of the object to be heated, an error may occur in the salinity measurement.

Therefore, the noncontact type salinity sensor 150b may measure the scattered light by using the plurality of detectors 154 which are spaced apart from each other in order to improve the accuracy in the salinity measurement.

Figure 14D:
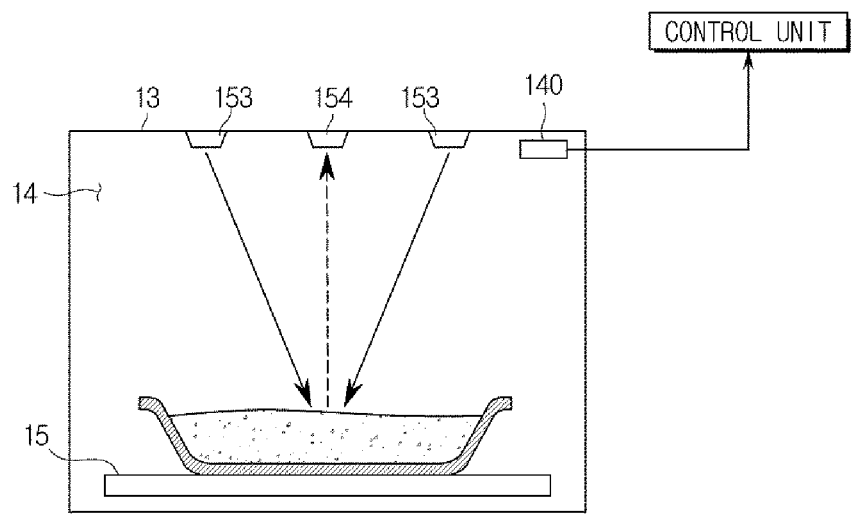
FIG. 14D is a view illustrating yet another exemplary embodiment of the noncontact type salinity sensor.

In addition, the noncontact type salinity sensor 150b may include a plurality of light sources 153, as shown in FIG. 14D. Since monochromatic light is radiated using the plurality of light sources 153 as above, the monochromatic light may be more evenly radiated to the object to be heated. In addition, the plurality of light sources 153 may radiate light of different wavelengths.

Furthermore, the noncontact type salinity sensor 150b may include the plurality of light sources 153 and the plurality of detectors 154, in order to further improve the accuracy in the salinity measurement.

The control unit 160, by and large, controls the cooking appliance 10. The control unit 160 may correspond to one or more processors. In particular, the one or more processors may be implemented by an array of a plurality of logic gates, and implemented by a combination of a universal microprocessor and a memory in which a program that may be executed in the microprocessor is stored.

Although the control unit 160 and the storage unit 120 were described as being separate with reference to FIG. 11B, the exemplary embodiments are not limited thereto, and the control unit 160 and the storage unit 120 may be configured as a single chip.

In particular, the control unit 160 may control a heat source 11 and a steam generation unit (also referred to herein as a "steam generator") 12 to cook an object to be heated in accordance with a control command received from a user, or control to transmit information which indicates a cooked state of the object to be heated to the external device 20. In this aspect, the control command may be input via the user interface 110 or the external device 20.

The heat source 11 is configured for providing heat to the object to be heated to cook the object to be heated. The heat source 11 may vary in accordance with the cooking appliance 10. In addition, the heat source 11 may be provided outside the cooking appliance 10.

In particular, the heat source 11 may heat an inner portion of the cooking compartment 14. A type of the heat source 11 may be determined in accordance with the cooking appliance 10.

For example, the heat source 11 may include an electric coil when the cooking appliance 10 is an electric oven or an induction heater that uses electricity to heat the inner portion of the cooking compartment, and the heat source 11 may include a burner configured for heating the inner portion of the cooking compartment by burning gas when the cooking appliance 10 is an oven. In addition, the heat source 11 may include a microwave generator when the cooking appliance 10 is a microwave oven.

The steam generation unit 12 is configured for providing moisture, and may generate hot vapor and provide the hot vapor to the object to be heated, but a method for providing moisture is not limited thereto.

In addition, the control unit 160 may determine a cooked state of the object to be heated based on the concentration of a reference substance which is detected in the concentration sensor 150. Since, as mentioned above, the concentration of the reference substance varies as cooking of the object to be heated continues, the control unit 160 may determine the cooked state of the object to be heated based on the concentration of the reference substance which is detected by the concentration sensor 150. Hereinafter, a method for determining the cooked state will be described in detail.

For example, the control unit 160 may determine the cooked state as a finished cooking state when the detected concentration of a reference substance reaches a reference concentration. The reference concentration may be preset based on a type of the object to be heated.

In addition, the reference concentration may be determined when cooking begins. In particular, the control unit 160 may determine the reference concentration based on a concentration which is detected when cooking begins.

For example, the reference concentration may be set higher as an initial concentration of a reference substance detected when cooking begins is higher, and the reference concentration may be set lower as the initial concentration of the reference substance is lower. In this aspect, the reference concentration may be determined in proportion to the initial concentration which is detected when cooking begins.

In addition, the control unit 160 may predict an amount of time remaining until cooking is finished by using a difference between a detected current concentration and a preset reference concentration of a reference substance.

Since the concentration of the reference substance varies in accordance with moisture evaporation as mentioned above, the control unit 160 may calculate the time at which the reference substance reaches the reference concentration by considering the speed of moisture evaporation in order to predict the amount of time remaining until cooking is finished.

As another example, the control unit 160 may determine a cooked state based on a change in the detected concentration of a reference substance. In particular, the control unit 160 may determine the cooked state as a finished cooking state when the change in the detected concentration of the reference substance becomes equal to or less than a critical value.

In addition, the control unit 160 may generate a concentration change graph in accordance with the change in the detected concentration of the reference substance, and determine the cooked state as the finished cooking state when an inflection point is generated in the concentration change graph.

In addition, the control unit 160 may predict the amount of time remaining until cooking is finished based on a change in the detected concentration of a reference substance.

Further, the control unit 160 may compensate a concentration value detected in the concentration sensor 150 based on a change in temperature of an object to be heated.

In particular, the temperature of the object to be heated rises as the object to be heated is cooked. Since an error may occur in the concentration sensor 150 due to the rise in temperature of the object to be heated as above, the control unit 160 may compensate for the change in concentration of a reference substance which is detected in the concentration sensor 150 based on the temperature of the object to be heated.

In one exemplary embodiment, since the amount of current flowing in the object to be heated increases when electrical conductivity of the object to be heated increases due to the rise in temperature of the object to be heated, a higher salinity may be measured than the actual salinity.

Conversely, since the amount of current flowing in the object to be heated decreases when the electrical conductivity of the object to be heated decreases due to the rise in temperature of the object to be heated, a lower salinity may be measured than the actual salinity.

Therefore, the control unit 160 may calculate a change in current caused by the change in electrical conductivity due to the change in temperature of the object to be heated, and compensate for a concentration detected in the concentration sensor 150 by a concentration that corresponds to the change in current based on the change in temperature.

In addition, the amount of molecular vibration changes when the temperature of the object to be heated rises, and the amount of scattered light changes due to the change in the amount of molecular vibration, even if salinity stays the same.

The control unit 160 calculates the change in the amount of scattered light caused by the change in the amount of molecular vibration based on the rise in temperature of the object to be heated. In addition, the control unit 160 may compensate for the concentration detected in the concentration sensor 150 by a concentration that corresponds to the change in the amount of scattered light based on the change in temperature.

Hereinafter, a method for determining a cooked state by using changes in temperature and concentration will be described in detail with reference to FIG. 15.

Figure 15:
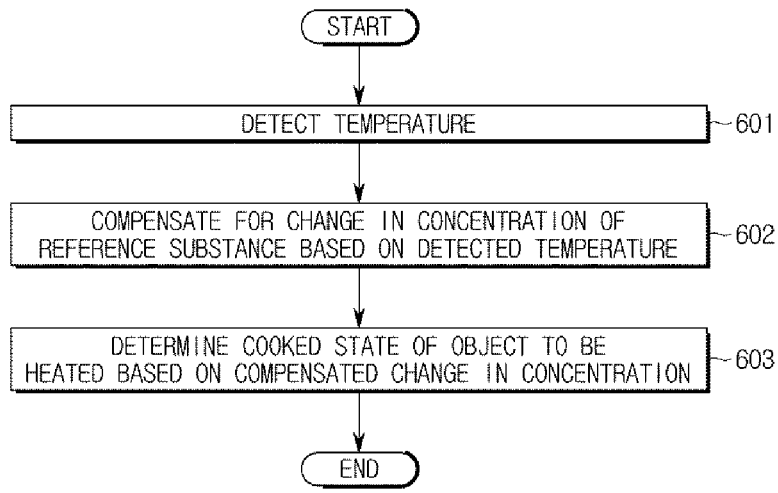
FIG. 15 is a flow chart illustrating an example of a method for determining a cooked state.

FIG. 15 is a flow chart illustrating an example of a method for determining a cooked state.

Referring to FIG. 15, in operation 601, the cooking appliance 10 detects the concentration and the temperature of a reference substance. Although the cooking appliance may perform concentration detection and temperature detection at the same time, the concentration detection and the temperature detection may also be performed as separate operations. In addition, the concentration detection and the temperature detection may be performed in accordance with a preset cycle.

In operation 602, the cooking appliance 10 compensates for the change in concentration of a reference substance based on the detected temperature. In particular, the control unit 160 calculates the change in temperature based on sequentially detected temperature values, and calculates the change in concentration based on sequentially detected concentration values. The control unit 160 calculates a concentration compensation value based on the calculated change in temperature, and applies the concentration compensation value to the change in concentration in order to compensate for an error caused by the change in temperature.

In operation 603, the cooking appliance 10 determines a cooked state of an object to be heated based on the compensated change in concentration. In particular, the control unit 160 may determine whether cooking is finished or predict an amount of time remaining until cooking is finished based on the change in concentration.

Further, the control unit 160 may determine whether an object to be heated is undercooked or overcooked based on the concentration of a reference substance which is detected in the concentration sensor 150. Hereinafter, determination of an undercooked state and an overcooked state will be described in detail with reference to FIG. 16.

Figure 16:
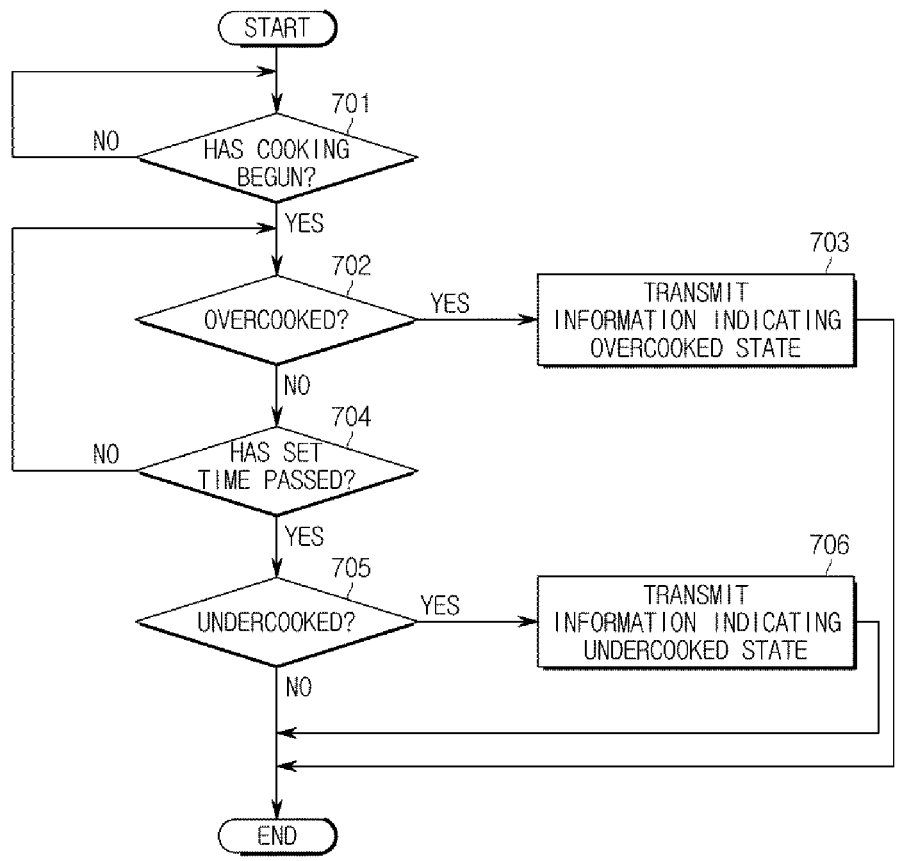
FIG. 16 is a flow chart illustrating another example of the method for determining a cooked state.

FIG. 16 is a flow chart illustrating another example of a method for determining a cooked state.

Referring to FIG. 16, in operation 701, the cooking appliance 10 determines whether cooking has begun.

Once cooking has begun, in operation 702, the cooking appliance 10 may determine whether a cooked state of an object to be heated is an overcooked state. The overcooked state represents a state in which the cooking appliance 10 continues cooking even if the cooking of the object to be heated has been finished, and the cooking appliance 10 may determine whether the cooked state of the object to be heated is the overcooked state based on the concentration of a reference substance.

For example, the cooking appliance 10 may determine the cooked state of the object to be heated as the overcooked state in which cooking is finished when the salinity increases up to a value equal to or greater than a preset critical value, or when the salinity change rate deviates from a preset critical range. The critical value and the critical range may be set variably based on a type of the object to be heated.

When the cooked state of the object to be heated is determined as the overcooked state (i.e., YES of operation 702), in operation 703, the cooking appliance 10 may transmit information to the external device 20 which indicates the overcooked state. Since the object to be heated may be overcooked if cooking continues at a state in which cooking is finished, the cooking appliance 10 may transmit the information which indicates the overcooked state to the external device 20 in order to inform a user of the occurrence of the overcooked state.

Further, the external device 20 that has received the information indicating the overcooked state may display the information which indicates the overcooked state as shown in FIG. 9, and the user may use the external device 20 to immediately stop cooking.

In addition, the cooking appliance 10 may display the occurrence of the overcooked state via the user interface 110.

When the cooked state of the object to be heated is not determined as the overcooked state (i.e., NO of operation 702), in operation 704, the cooking appliance 10 determines whether a set amount of time has passed. The set amount of time may be set by the user, but may be automatically selected in the cooking appliance 10 based on a cooking course selected by the user.

When the set time has not elapsed (i.e., NO of operation 704), the cooking appliance 10 may continue cooking the object to be heated, and redetermine whether the object to be heated is overcooked in operation 702.

When the set time has elapsed (i.e., YES of operation 704), in operation 705, the cooking appliance 10 determines whether the cooked state of the object to be heated is an undercooked state. The undercooked state represents a state of requiring further cooking of the object to be heated, and the cooking appliance 10 may determine whether the cooked state of the object to be heated is the undercooked state based on the concentration of the reference substance.

For example, the cooking appliance 10 may determine the cooked state of the object to be heated as the undercooked state in which further cooking is required when the salinity is equal to or less than the preset critical value or the salinity change rate is within the preset critical range.

When the cooked state of the object to be heated is determined as the undercooked state (i.e., YES of operation 705), the cooking appliance 10 may transmit information which indicates the undercooked state to the external device 20. Since the user cannot obtain a desired cooking result if cooking is ended at the undercooked state, the cooking appliance 10 may transmit the information indicating the undercooked state to the external device 20 in order to inform the user of the occurrence of the undercooked state. The external device 20 that has received the information indicating the undercooked state may display the information indicating the undercooked state as shown in FIG. 10, and the user may use the external device 20 to control the cooking appliance 10 to perform further cooking.

In this aspect, the cooking appliance 10 may display information which indicates the occurrence of the undercooked state via the user interface 110.

Further, the control unit 160 may automatically determine a cooking method based on user information, i.e., information received from a user. The user information represents information that may be used in setting a method for cooking the object to be heated, and, for example, may include information such as user health information, or information that relates to the salinity preference of the user, and the like.

The user information may be input via the user interface 110 or the external device 20, and the input user information may be stored in the storage unit 120.

In particular, the cooking appliance 10 may determine the method for cooking the object to be heated based on the user information. Any one or more of a cooking time of the object to be heated, the intensity of heat to be provided to the object to be heated, the concentration of a reference substance when cooking is finished, and the amount of steam to be provided to the object to be heated may be determined based on the method for cooking the object to be heated.

For example, a low-salt diet is required when a user has hyperlipidemia or high blood pressure. Therefore, the cooking appliance 10 may determine whether the low-salt diet is required for the user based on the user health information, and may determine the cooking method such that the object to be heated will have a low salinity if the low-salt diet is required for the user.

In addition, the user information may further include age information of a user who will ingest a dish. Generally, since a recommended intake of salt is different for each age group, the cooking appliance may determine a cooking method based on the user information. For example, the cooking appliance may determine the cooking method such that an object to be heated will be cooked so as to have a low salinity when a user is an infant.

In addition, the cooking appliance may determine the cooking method such that the object to be heated will have a low salinity when a user prefers low salinity, and determine the cooking method such that the object to be heated will have a high salinity when the user prefers high salinity.

Hereinafter, the selection of a cooking method of the cooking appliance 10 will be described in detail with reference to FIG. 17.

Figure 17:
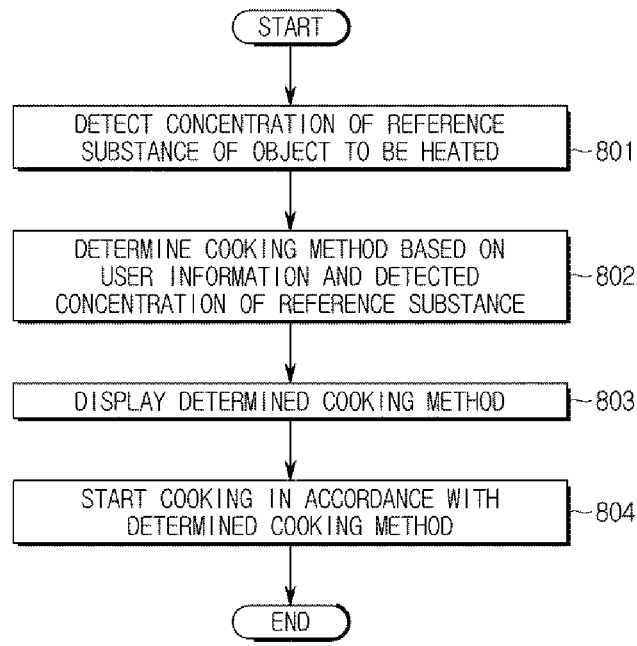
FIG. 17 is a flow chart for describing the selection of a cooking method.

FIG. 17 is a flow chart for describing the selection of a cooking method.

Referring to FIG. 17, in operation 801, the cooking appliance 10 detects the concentration of a reference substance of an object to be heated. The cooking appliance 10 detects the concentration of the reference substance of the object to be heated prior to the beginning of cooking. In particular, the salinity of the object to be heated may be detected.

In operation 802, the cooking appliance 10 determines a cooking method based on the user information and the detected concentration of the reference substance.

In particular, the cooking appliance 10 sets a target salinity when cooking is finished based on the user information. In addition, the cooking appliance 10 predicts the salinity of the object to be heated when cooking is finished based on the concentration of the reference substance. The cooking appliance 10 sets the cooking method such that the predicted salinity of the object to be heated converges to the target salinity. Setting the cooking method based on the user information will be described in detail below with reference to FIG. 18.

In addition, the cooking appliance 10 may generate an additional recipe step when additional preparation is required in order for the predicted salinity to converge to the target salinity. For example, the cooking appliance 10 may generate the additional recipe step by calculating an amount of water or salt that should be added to reach the target salinity.

In operation 803, the cooking appliance 10 displays the determined cooking method. The cooking method may be provided via the user interface 110 or the external device 20, and, when a cooking method which is manually set by a user is different from the determined cooking method, the cooking appliance 10 may display the manually set cooking method and the determined cooking method at the same time such that the user can determine the cooking method.

In addition, when the additional recipe step is generated, the additional recipe step may be provided by using the user interface 110 or the external device 20. For example, the amount of water that should be added may be displayed via the user interface 110.

In operation 804, the cooking appliance 10 begins cooking in accordance with the determined cooking method. In particular, the cooking appliance 10 may control the heat source 11 to provide a set amount of heat to the object to be heated for a set cooking time in order to cook the object to be heated.

In addition, steam may be controlled such that a set amount of moisture is provided to the object to be heated for a set time.

Figure 18:
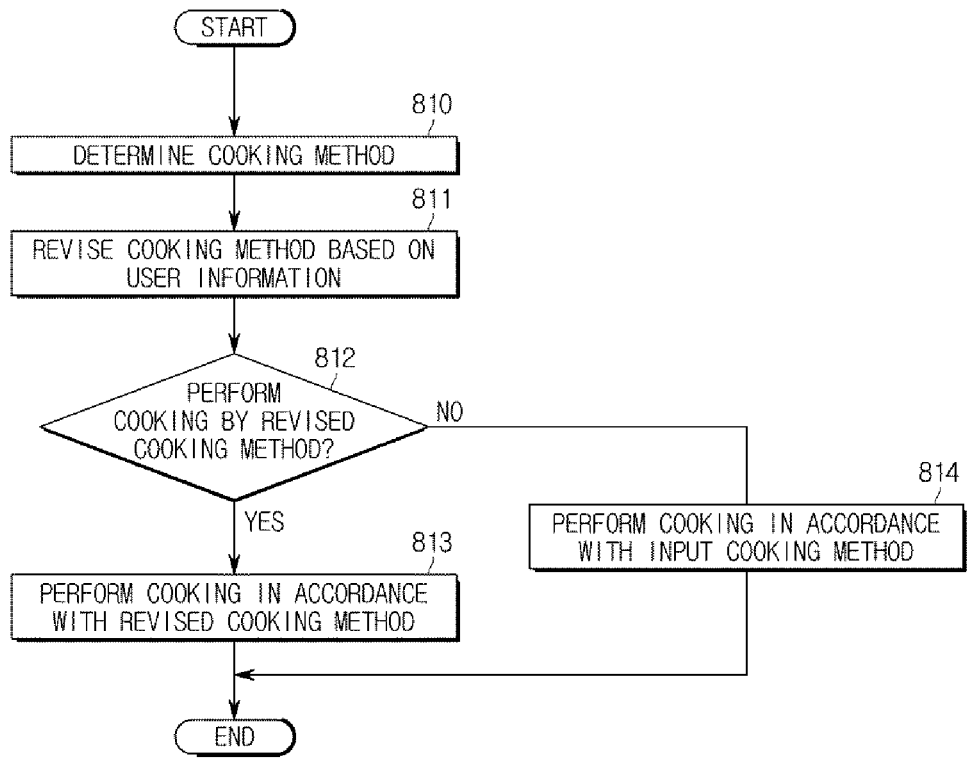
FIG. 18 is a flow chart illustrating a method for controlling a cooking appliance based on information provided by a user.

FIG. 18 is a flow chart illustrating a method for controlling a cooking appliance based on user information.

Referring to FIG. 18, in operation 810, the cooking appliance 10 determines a cooking method. The cooking method may be determined based on user input.

In particular, the user may input a cooking method via the user interface 110 which is provided at the cooking appliance 10, or determine the cooking method by using the external device 20 that is forming the home network with the cooking appliance 10.

In operation 811, the cooking appliance 10 revises or adjusts the cooking method based on user information, i.e., information received from a user. The user information may be input via the user interface 110 of the cooking appliance 10, or received via the external device 20.

Since a recommended cooking method may vary based on a user's health condition, the cooking appliance 10 may revise or adjust the determined cooking method based on the user information in order to optimally cook the object to be heated.

For example, the cooking appliance 10 may adjust the cooking method such that the object to be heated is cooked to have a low salinity when a user is a patient having hyperlipidemia or high blood pressure for whom a low-salt diet is recommended. In addition, the cooking appliance 10 may adjust the cooking method such that the object to be heated is cooked to have a lower salinity than a recommended salinity for adults when a user is a child for whom a lower-salt diet is recommended, as compared to an adult.

In addition, since a preferred cooking method may vary for each user, the cooking appliance 10 may revise or adjust the determined cooking method based on user preference.

For this, the cooking appliance 10 may store information which indicates the salinity of the object to be heated when cooking is actually finished, obtain a degree of salinity preferred by a user by using the stored salinity information, and revise or adjust the cooking method based on the obtained salinity information.

In operation 812, the cooking appliance 10 confirms whether to perform cooking by the revised cooking method. The cooking appliance 10 may display the revised cooking method via the user interface 110 in order to confirm whether to perform cooking in accordance with the revised cooking method, or transmit information which indicates the revised cooking method to the external device 20 via the communication unit 130 in order to confirm whether to perform cooking in accordance with the revised cooking method.

In operation 813, the cooking appliance 10 performs cooking based on the revised cooking method when a determination is made to perform cooking by the revised cooking method as a result of operation 812, and in operation 814, the cooking appliance 10 performs cooking based on an input cooking method when a determination is made to perform cooking by the input cooking method as a result of operation 812.

Further, the control unit 160 may generate information which indicates that a standard cooked state has been reached when the object to be heated reaches a standard cooked state, and may transmit the generated information to the external device 20.

The standard cooked state represents a cooked state of the object to be heated which is preset in accordance with the concentration of a reference substance, and for example, the standard cooked state may be set with respect to a change in taste of the object to be heated when cooking is finished. Hereinafter, the standard cooked state will be described in detail.

Figures 19, 20, 21:
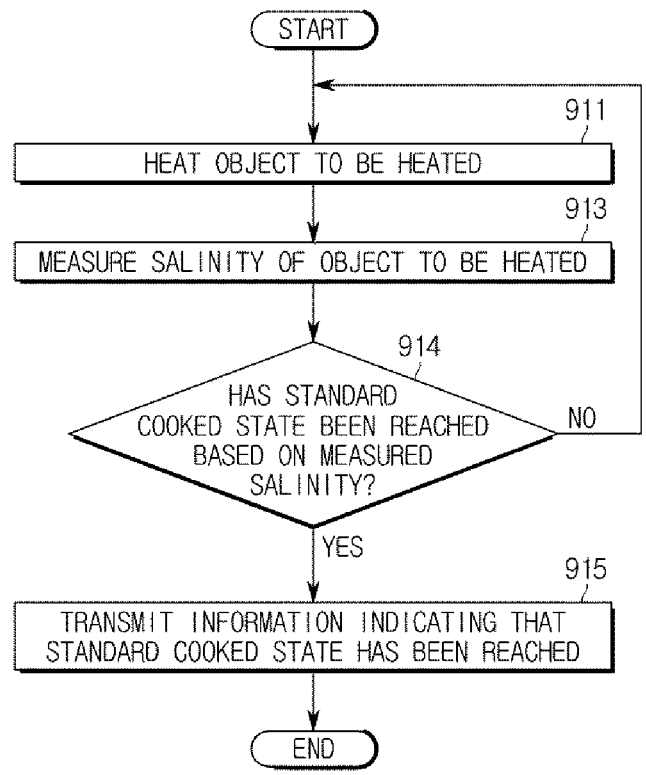
FIG. 19 is a view for describing an exemplary embodiment of a standard cooked state of an object to be heated.
FIG. 20 is a view for describing another exemplary embodiment of the standard cooked state of an object to be heated.
FIG. 21 is a flow chart illustrating a method for cooking an object to be heated of the cooking appliance, according to an exemplary embodiment.

FIG. 19 is a view for describing an exemplary embodiment of a standard cooked state of an object to be heated, and FIG. 20 is a view for describing another exemplary embodiment of the standard cooked state of the object to be heated.

Referring to FIG. 19, the standard cooked state may be set based on salinity. As described above, salinity gradually becomes higher as cooking continues. In particular, an object to be heated gradually becomes saltier as cooking continues. The standard cooked state may be set with respect to a change in salty taste of the object to be heated, i.e. an extent to which the object to be heated is salty.

In this aspect, for example, the standard cooked state may be classified as a second standard state which corresponds to an average standard salinity of 1.0%, a first standard state which corresponds to a low salinity of 0.9%, and a third standard state which corresponds to a high salinity of 1.1%.

In particular, the first standard state represents a state in which the object to be heated is cooked to taste relatively bland, the second standard state represents a state in which the object to be heated is cooked to have a reference salinity, and the third standard state represents a state in which the object to be heated is cooked to taste relatively salty.

By classifying the standard cooked state for each degree of salinity and being informed of whether the standard cooked state has been reached as described above, a user may easily cook food to a preferred degree of salinity.

Further, as shown in FIG. 20, the standard cooked state may be set based on a degree of being cooked. FIG. 20 is a table representing a standard cooked state of steak. A cooked state of steak changes in accordance with a cooking time.

In this aspect, as the cooking time increases, the standard state of steak changes in the order of rare, medium, and well-done. Therefore, the standard cooked state of steak may be set with respect to the degree to which the steak is cooked.

In particular, for example, the standard cooked state of the steak may be classified as a rare state which corresponds to a salinity of 0.7%, a medium state which corresponds to a salinity of 0.8%, and a well-done state which corresponds to a salinity of 1.0%.

Hereinafter, a cooking method using a standard cooked state will be described in detail.

Figure 22A:
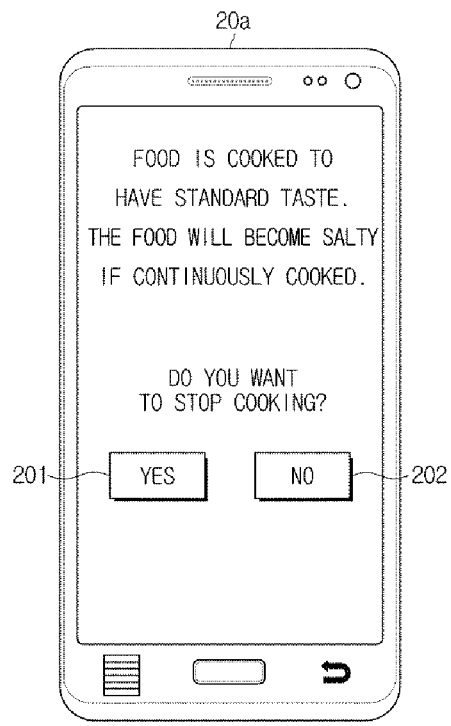
FIG. 22A is an example of a screen for displaying information which indicates that a standard cooked state has been reached.
Figure 22B:
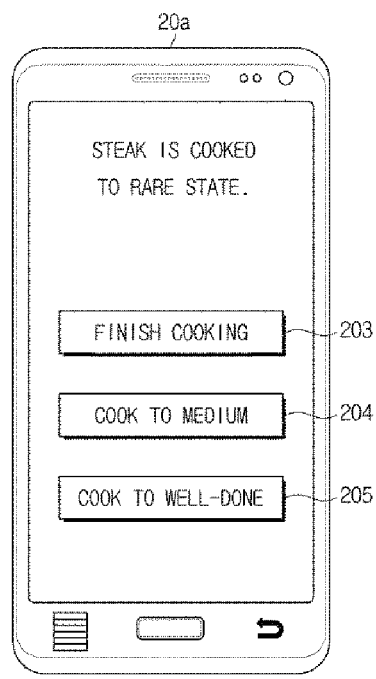
FIG. 22B is another example of a screen for displaying information which indicates that a standard cooked state has been reached.

FIG. 21 is a flow chart illustrating the method for cooking an object to be heated by using a cooking appliance according to an exemplary embodiment, and FIGS. 22A and 22B are illustrative views of a screen for displaying information which indicates that a standard cooked state has been reached.

Referring to FIG. 21, in operation 911, the cooking appliance 10 heats an object to be heated. In particular, the cooking appliance may use the heat source 11 to heat the object to be heated which is provided inside the cooking compartment 14.

In operation 913, the cooking appliance 10 measures the salinity of the object to be heated. Although the salinity of the object to be heated may be measured every preset cycle, exemplary embodiments are not limited thereto.

In operation 914, the cooking appliance 10 determines whether a standard cooked state has been reached based on the measured salinity. The cooking appliance 10 may compare the measured salinity to a preset salinity of a standard cooked state in order to determine whether the standard cooked state has been reached.

When a cooked state has reached the standard cooked state (i.e., YES with respect to operation 914), in operation 915, the cooking appliance 10 transmits the information which indicates that the standard cooked state has been reached. The information indicating that the standard cooked state has been reached may include at least one of information which relates to a current cooked state of an object to be heated and information which relates to a predicted change in the cooked state when the object to be heated is further cooked.

In particular, the cooking appliance 10 may determine the current cooked state of the object to be heated, and predict the change in the cooked state of the object to be heated when cooking continues from the current cooked state of the object to be heated in order to generate the information which indicates that the standard cooked state has been reached.

For example, when the cooked state of the object to be heated has reached the first standard state in FIG. 19, the cooking appliance 10 may determine that the object to be heated is currently cooked to taste bland, predict that the object to be heated will be cooked to have a standard taste when further cooked, generate the information indicating that the standard cooked state has been reached, and transmit the generated information to the external device 20.

The information indicating that the standard cooked state has been reached which is generated by the cooking appliance 10 as described above may be displayed via the external device 20, and a user may use the external device 20 to control whether the cooking appliance 10 stops cooking or continues cooking.

Further, when the object to be heated is continuously cooked and the cooked state of the object to be heated has reached the second standard state in FIG. 19, the cooking appliance 10 determines that the object to be heated is currently cooked to have a standard taste, predicts that the object to be heated may be cooked to taste salty when further cooked, and generates the information indicating that the standard cooked state has been reached.

The generated information indicating that the standard cooked state has been reached is transmitted to the external device 20 via the communication unit 130.

The external device 20 that has received the information indicating that the standard cooked state has been reached may display a current cooked state of the object to be heated and a predicted change in the cooked state when the object to be heated is further cooked, as shown in FIG. 22A. As a result, a user may select a first icon 201 displayed on the portable terminal 20a in order to stop cooking, or select a second icon 202 in order to continue cooking.

As another example, the cooking appliance may determine that steak has reached a rare state when the measured salinity of the steak has reached 0.7%, determine that a current cooked state of the steak is the rare state, predict that the steak will be cooked to medium or well-done when further cooked, generate the information indicating that the standard cooked state has been reached, and transmit the information to the external device 20.

Further, as shown in FIG. 22B, the external device 20 that has received the information indicating that the standard cooked state has been reached may display that the current cooked state of the object to be heated is a rare state, and display a screen to enable a user to select a desired cooked state.

In particular, the user may select a "finish cooking" icon 203 displayed on the portable terminal 20a in order to end steak cooking, select a "cook to medium" icon 204 in order to input cooking the steak to the medium state, or select a "cook to well-done" icon 205 in order to input cooking the steak to the well-done state.

When a control command is input via the portable terminal 20a, the portable terminal 20a transmits the input control command to the cooking appliance 10.

By providing the information which indicates that the standard cooked state has been reached to the user every time a preset standard cooked state is reached as above, cooking the object to be heated may be facilitated.

Hereinafter, a cooking method which is executable by using a cooking appliance will be described in detail.

Figure 23:
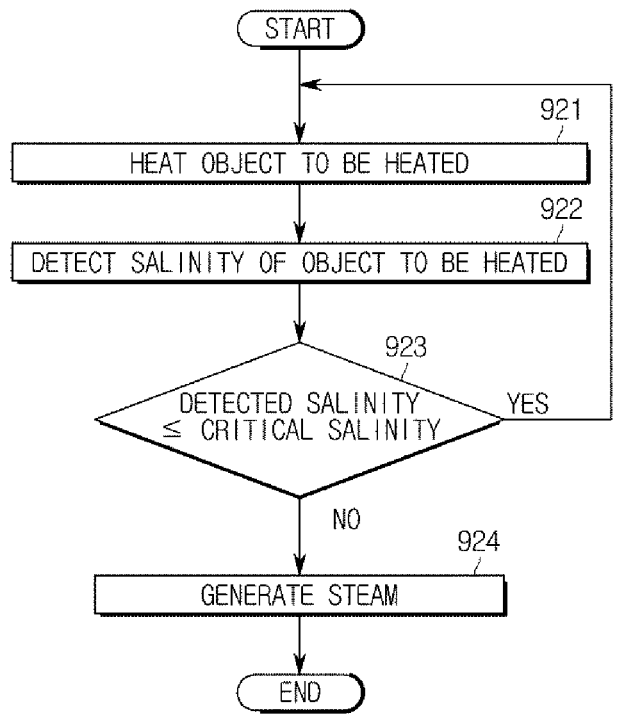
FIG. 23 is a flow chart illustrating a method for cooking an object to be heated of the cooking appliance, according to another exemplary embodiment.
Figure 24:
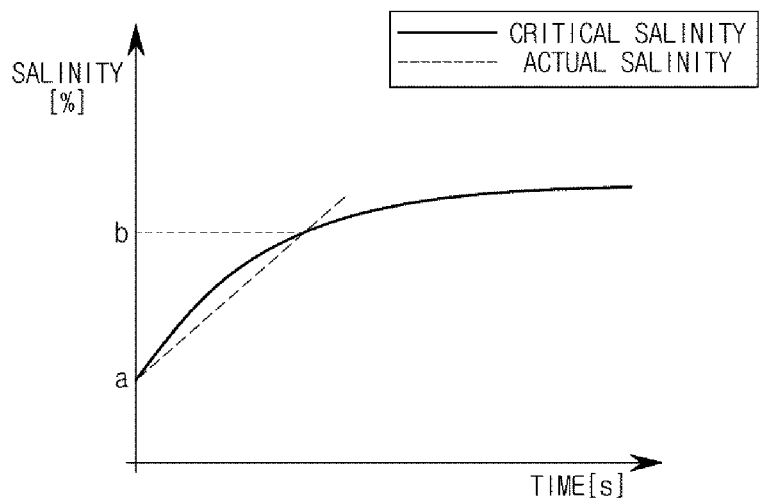
FIG. 24 is a view illustrating an exemplary embodiment of critical salinity.

FIG. 23 is a flow chart illustrating a method for cooking an object to be heated of a cooking appliance according to another exemplary embodiment, and FIG. 24 is a view illustrating an exemplary embodiment of critical salinity.

Referring to FIG. 23, in operation 921, the cooking appliance 10 may control the heat source to heat an object to be heated, and in operation 922, the cooking appliance may detect the salinity of the object to be heated.

In operation 923, the cooking appliance 10 compares the detected salinity to a critical salinity. In particular, the critical salinity represents the salinity for cooking the object to be heated so as to taste properly salty, and the critical salinity value may vary in accordance with a cooking time, as shown in FIG. 24.

Since the recommended intake of salt varies in accordance with a user as described above, the critical salinity may be set variably based on the user and a type of the object to be heated.

When the detected salinity is higher than the critical salinity (i.e., NO with respect to operation 923), in operation 924, the cooking appliance 10 controls the steam generation unit 12 to generate steam. For example, when the actual salinity becomes higher than the critical salinity b, the cooking appliance 10 generates steam.

Since salinity increases due to moisture evaporation as mentioned above, the cooking appliance 10 may provide steam to the cooking compartment 14 in order to minimize moisture evaporation, thereby preventing an object to be heated from becoming too salty.

Figure 25:
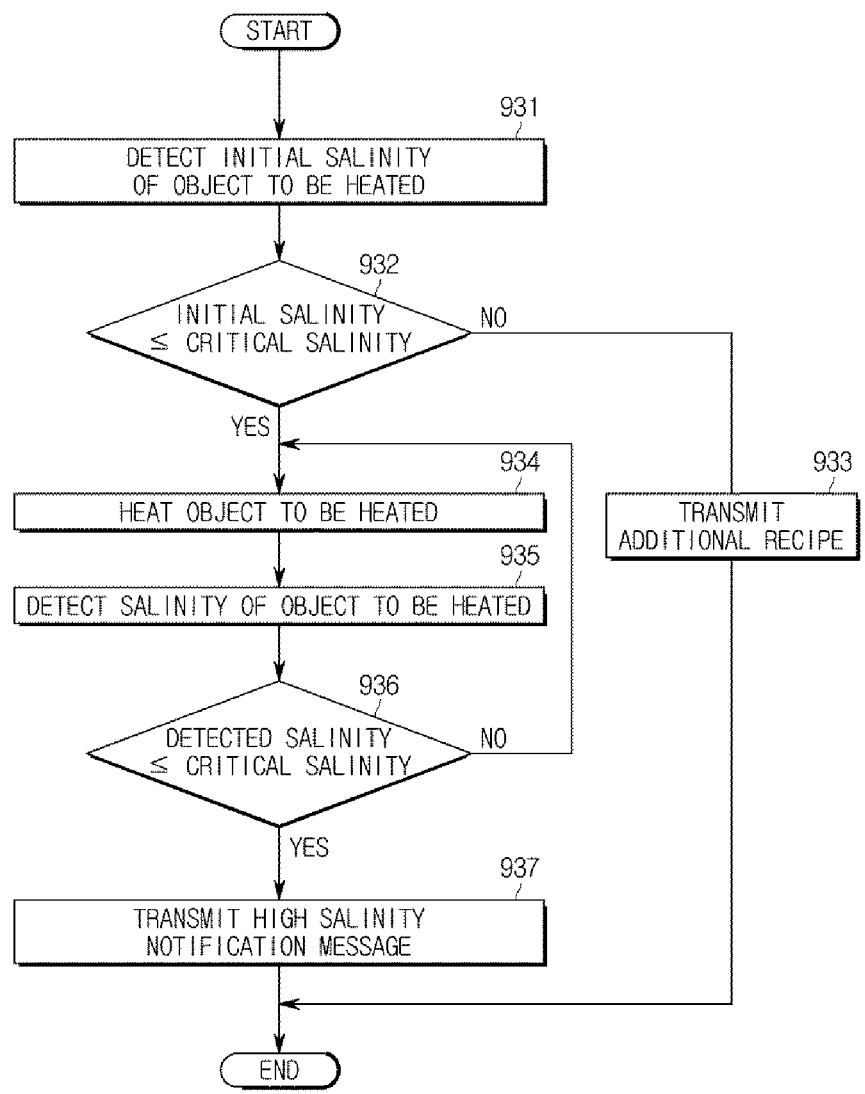
FIG. 25 is a flow chart illustrating a method for cooking an object to be heated of a cooking appliance, according to still another exemplary embodiment.
Figure 26:
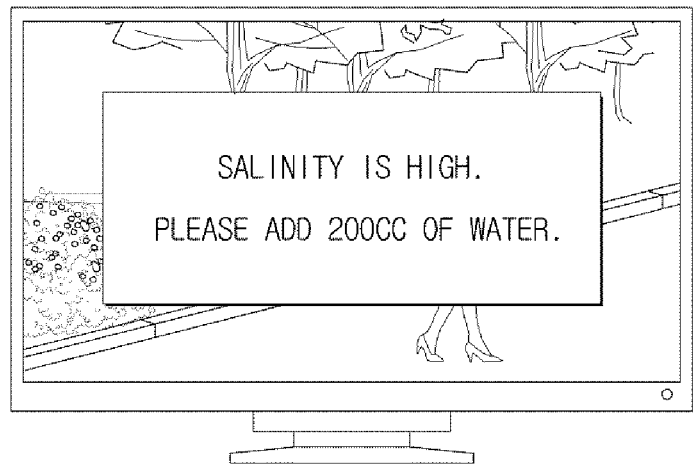
FIG. 26 is an illustrative view of a screen for displaying information which indicates an additional recipe step.
Figure 27:
FIG. 27 is an illustrative view of a screen for displaying a high salinity notification message.

FIG. 25 is a flow chart illustrating a method for cooking an object to be heated of a cooking appliance according to still another exemplary embodiment, FIG. 26 is an illustrative view of a screen for displaying an additional recipe step, and FIG. 27 is an illustrative view of a screen for displaying a high salinity notification message.

Referring to FIG. 25, in operation 931, the cooking appliance 10 detects the initial salinity of an object to be heated, and in operation 932, the cooking appliance 10 compares the detected initial salinity to a critical salinity. Since the critical salinity changes as the cooking time increases as shown in FIG. 24, the cooking appliance 10 may compare the initial critical salinity a to the detected initial salinity.

When the initial salinity is higher than the critical salinity a (i.e., NO with respect to operation 932), in operation 933, the cooking appliance 10 transmits information which indicates an additional recipe step to the external device 20.

Since the object to be heated is cooked to high salinity if the initial salinity thereof is excessively high, the cooking appliance 10 may calculate an amount of water that should be added for the initial salinity thereof to become the initial salinity a, and generate and transmit the information which indicates an additional recipe step.

As shown in FIG. 26, the external device 20 that has received the information indicating an additional recipe step may display the information indicating the additional recipe step. The additional recipe step is provided as described above, thereby preventing the object to be heated from being cooked to excessively high salinity.

Conversely, an additional recipe step that calls for adding salt may be generated when the initial salinity of the object to be heated is excessively low.

Further, in operation 934, the cooking appliance 10 heats the object to be heated if the critical salinity is equal to or higher than the initial salinity.

In operation 935, the cooking appliance 10 detects the salinity of the object to be heated, and in operation the 936, the cooking appliance 10 compares the detected salinity to the critical salinity.

When the detected salinity is higher than the critical salinity b, in operation 937, the cooking appliance 10 transmits a high salinity notification message to the external device 20.

The external device 20 that has received the high salinity notification message may display the received high salinity notification message, as shown in FIG. 27. The high salinity notification message is provided as above, thereby preventing the object to be heated from being cooked to excessively high salinity.

In addition, the cooking appliance 10 may provide steam to the object to be heated while providing the high salinity notification message.

Further, when the detected salinity is equal to or lower than the critical salinity, the cooking appliance 10 continues to heat the object to be heated in operation 934.

Figure 28:
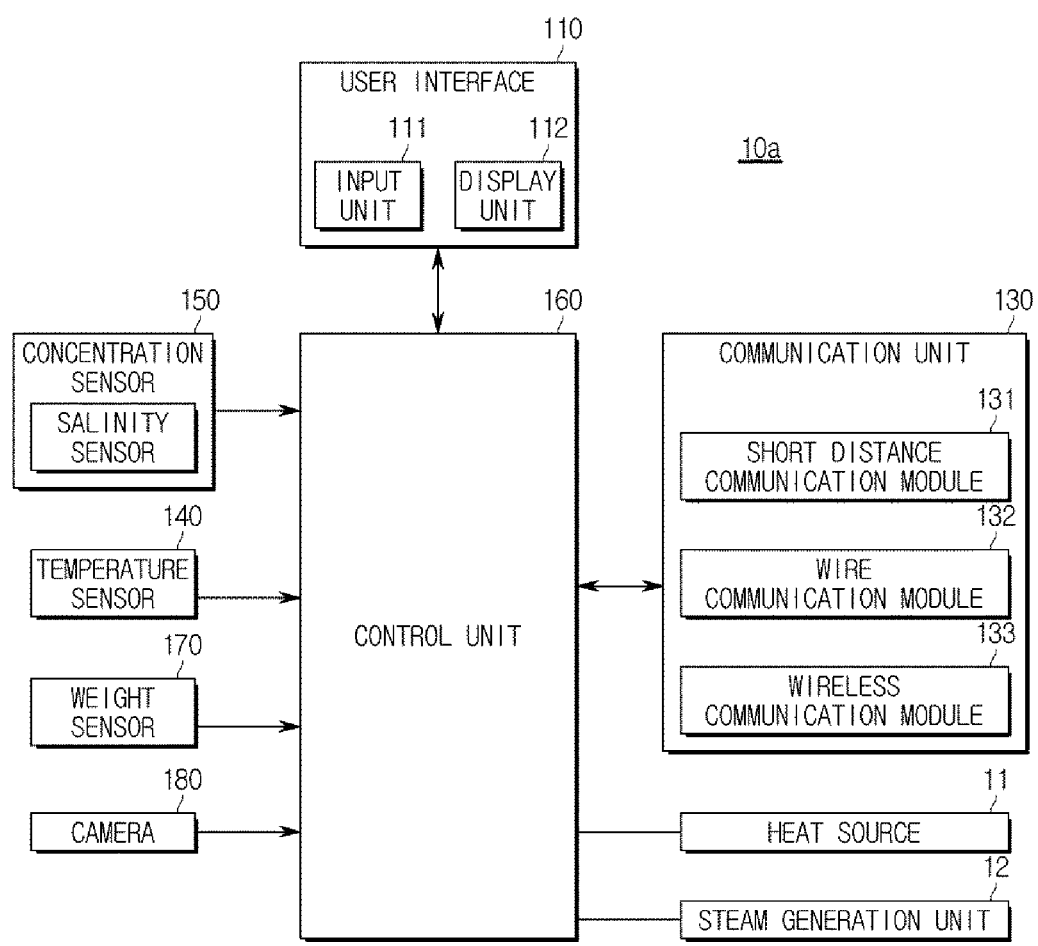
FIG. 28 is a control block diagram of a cooking appliance, according to another exemplary embodiment.

FIG. 28 is a control block diagram of a cooking appliance, according to another exemplary embodiment.

Referring to FIG. 28, a cooking appliance 10a according to another exemplary embodiment includes a user interface 110, a storage unit 120, a communication unit 130, a temperature sensor 140, a concentration sensor 150, a weight sensor 170, and a camera 180. Hereinafter, like reference numerals will be given to like elements of the cooking appliance 10 in FIG. 11B, and detailed description thereof will be omitted.

The cooking appliance 10a according to another exemplary embodiment may further include the weight sensor 170. The weight sensor 170 detects a weight of an object to be heated. The weight sensor 170 may be provided at a lower portion of the cooking compartment 14, e.g. a lower end of the mounting unit 15, in order to detect the weight of the object to be heated which is mounted on the mounting unit 15.

For example, the weight sensor 170 includes a strain gauge in which an electrical resistance value varies based on a mechanical strain, and may detect the weight of the object to be heated based on the change in electrical resistance value.

In addition, the cooking appliance 10a according to another exemplary embodiment may further include the camera 180. The camera 180 is provided at an upper portion of the cooking compartment 14 and configured to obtain an image of the object to be heated inside the cooking compartment. The camera 180 may include a charge-coupled device (CCD) image sensor configured for obtaining the image of the object to be heated.

The control unit 160 may automatically determine a method for cooking the object to be heated. Hereinafter, automatically determining the method for cooking the object to be heated will be described in detail with reference to FIG. 29.

Figure 29:
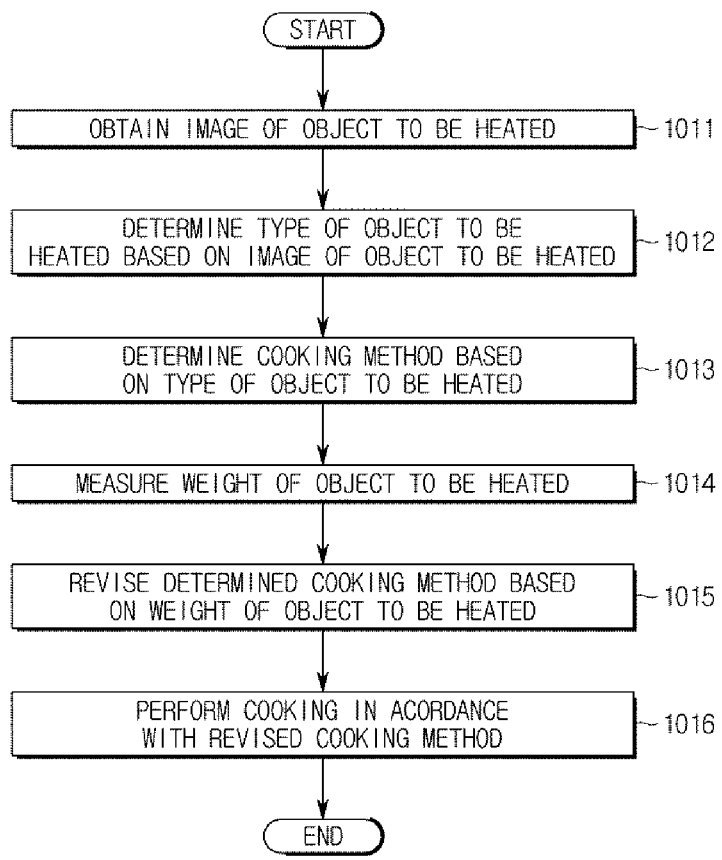
FIG. 29 is a flow chart for describing the automatic determination of a method for cooking an object to be heated.

FIG. 29 is a flow chart for describing the automatic determination of a method for cooking an object to be heated.

Referring to FIG. 29, in operation 1011, the cooking appliance 10a obtains an image of an object to be heated. In particular, the cooking appliance 10a controls the camera 180 to photograph an inner portion of the cooking compartment 14 in order to obtain the image of the object to be heated which is accommodated inside the cooking compartment 14.

In operation 1012, the cooking appliance 10a determines a type of the object to be heated based on the image of the object to be heated.

In particular, the cooking appliance 10a may compare the image of the object to be heated which is obtained by the camera 180 to a plurality of reference images provided for each type of an object to be heated in order to determine the type of the objected to be heated by the reference image which is the most similar with the image of the object to be heated.

In operation 1013, the cooking appliance 10a determines a cooking method based on the type of the object to be heated. Since each of the cooking time, the heating temperature, the concentration of a reference substance when cooking is finished, and the concentration of a standard substance varies based on the type of the object to be heated, the cooking appliance 10a may determine the cooking method based on the type of the object to be heated.

In operation 1014, the cooking appliance 10a measures the weight of the object to be heated, and then in operation 1015, the cooking appliance revises or adjusts the determined cooking method based on the weight of the object to be heated. For example, the cooking appliance 10a may set the cooking time to be relatively long when the amount of the object to be heated is great, and set the cooking time to be relatively short when the amount of the object to be heated is small.

Further, in operation 1015, the cooking appliance 10a may revise or adjust the method for cooking the object to be heated by using at least one of the user information and the initial concentration of a reference substance which are described above.

In operation 1016, the cooking appliance 10a performs cooking in accordance with the revised cooking method.

A cooked state of an object to be heated can be accurately determined by the cooking appliance and the method for controlling the same which are described above.

Those of ordinary skill in the art related to exemplary embodiments according to the present inventive concept will be able to understand that the exemplary embodiments may be implemented by being modified in a form which does not depart from the fundamental characteristics and the scope of the present inventive concept. Therefore, the disclosed exemplary embodiments should be considered from an illustrative point of view instead of a limitative point of view. The scope of the present inventive concept is shown in the appended claims instead of the detailed description of the present inventive concept, and all differences within the same scope of the appended claims should be construed as belonging to the scope of the present inventive concept.

What is claimed is:

1. A cooking appliance, comprising:
   a heat source;
   a concentration sensor configured to detect a concentration value of a reference substance which changes in accordance with cooking progress which relates to an object to be heated;
   a controller configured to determine a cooked state of the object based on the detected concentration value of the reference substance, and to control the heat source based on the determined cooked state of the object; and
   a communicator configured to transmit, to an external device, information which indicates the determined cooked state of the object,
   wherein the concentration sensor is further configured to detect a current flowing in the object,
   wherein the controller is further configured to:
   identify a temperature change of the object,
   calculate a change in the current flowing in the object caused by a change in electrical conductivity of the object according to the temperature change of the object by controlling the heat source,
   calculate a concentration compensation value corresponding to the calculated change in the current,
   compensate for the detected concentration value of the reference substance by the calculated concentration compensation value corresponding to the calculated change in the current, and
   determine the cooked state of the object based on the compensated concentration value of the reference substance,
   wherein the concentration compensation value corresponds to a difference between an actual concentration value of the reference substance and the detected concentration value of the reference substance, the difference being a measurement error of the detected concentration value of the reference substance occurring in the concentration sensor due to the temperature change of the object.

2. The cooking appliance according to claim 1, wherein the concentration sensor comprises a salinity sensor configured to detect a salinity of the object.

3. The cooking appliance according to claim 2, wherein the salinity sensor comprises:
   a plurality of electrodes which are spaced apart from each other and which are configured to come in contact with the object; and
   a current sensor configured to detect the current flowing in the object when a voltage is applied to at least one electrode from among the plurality of electrodes.

4. The cooking appliance according to claim 2, wherein the salinity sensor comprises:
   at least one light source configured to radiate light toward the object; and
   at least one light detector configured to detect scattered light generated by the reference sub stance.

5. The cooking appliance according to claim 4, further comprising a cooking compartment in which the object is cooked, and wherein the at least one light detector is provided at an upper portion of the cooking compartment.

6. The cooking appliance according to claim 2, further comprising a steam generator configured to provide moisture to the object, and wherein the controller is further configured to control the steam generator to provide moisture to the object when the detected salinity of the object is greater than a predetermined critical salinity.

7. The cooking appliance according to claim 1, wherein the controller is further configured to determine whether the cooked state of the object is a finished state based on the detected concentration value of the reference substance.

8. The cooking appliance according to claim 7, wherein the controller is further configured to determine that the cooked state of the object is the finished state when the detected concentration value of the reference substance reaches a preset finished cooking concentration value, or when a change in the detected concentration value of the reference substance becomes equal to or less than a preset critical value.

9. The cooking appliance according to claim 1, wherein, when the detected concentration value of the reference substance corresponds to a preregistered standard cooked state, the controller is further configured to control the communicator to transmit information which indicates that the preregistered standard cooked state has been reached.

10. The cooking appliance according to claim 9, wherein the controller is further configured to predict a change in the cooked state of the object, and to generate the information which indicates that the standard cooked state has been reached based on the predicted change in the cooked state and a current cooked state of the object.

11. The cooking appliance according to claim 1, wherein the controller is further configured to control the communicator to transmit an error message to the external device when an initial concentration value of the reference substance deviates from a preset critical range.

12. The cooking appliance according to claim 1, wherein the controller is further configured to determine a method for cooking the object based on a type of the object.

13. The cooking appliance according to claim 12, further comprising a camera configured to obtain an image of the object, and wherein the controller is further configured to determine the type of the object based on the obtained image of the object.

14. The cooking appliance according to claim 12, wherein the controller is further configured to adjust the method for cooking the object based on a detected initial concentration value of the reference substance and a weight of the object.

15. The cooking appliance according to claim 12, wherein the controller is further configured to adjust the method for cooking an object based on information received from a user.

16. The cooking appliance according to claim 1, wherein the controller is further configured to determine at least one from among an overcooked state and an undercooked state based on the detected concentration value of the reference substance.

17. A cooking apparatus, comprising:
a heat source configured to radiate heat toward an object to be cooked;
a sensor configured to detect a concentration value of a first substance from among at least two ingredient substances contained within the object; and
a controller configured to determine a remaining amount of cooking time based on the detected concentration value of the first substance, and to provide, to an external device, information relating to the determined remaining amount of cooking time,
wherein the sensor is further configured to detect a current flowing in the object,
wherein the controller is further configured to:
identify a temperature change of the object,
calculate a change in the current flowing in the object caused by a change in electrical conductivity of the object according to the temperature change of the object by controlling the heat source,
calculate a concentration compensation value corresponding to the calculated change in the current,
compensate for the detected concentration value of the first substance by the calculated concentration compensation value corresponding to the calculated change in the current, and
determine the remaining amount of cooking time based on the compensated concentration value of the first substance,
wherein the concentration compensation value corresponds to a difference between an actual concentration value of the reference substance and the detected concentration value of the reference substance, the difference being a measurement error of the detected concentration value of the reference substance occurring in the concentration sensor due to the temperature change of the object.

18. The cooking apparatus of claim 17, wherein the first substance comprises a salt, and the sensor comprises a salinity sensor.

19. The cooking apparatus of claim 18, further comprising a temperature sensor configured to detect a temperature of the object,
wherein the controller is further configured to adjust the determined remaining amount of cooking time based on the detected temperature.

20. The cooking apparatus of claim 17, wherein the controller is further configured to receive information from a user, and to adjust the determined remaining amount of cooking time based on the received information from the user.

21. The cooking apparatus of claim 17, wherein the external device includes a display, and the information relating to the determined remaining amount of cooking time includes displayable information relating to a cooking status selected from among an undercooked status, a completed status, and an overcooked status.

* * * * *